(12) United States Patent  (10) Patent No.: US 7,568,991 B2
Inuta  (45) Date of Patent: Aug. 4, 2009

(54) MULTISPEED AUTOMATIC TRANSMISSION

(75) Inventor: Yukiyoshi Inuta, Kanagawa (JP)

(73) Assignee: JATCO Ltd, Fuji-shi (JP)

( * ) Notice: Subject to any disclaimer, the term of this patent is extended or adjusted under 35 U.S.C. 154(b) by 495 days.

(21) Appl. No.: 11/529,572

(22) Filed: Sep. 29, 2006

(65) Prior Publication Data

US 2007/0105682 A1  May 10, 2007

(30) Foreign Application Priority Data

Oct. 3, 2005 (JP) ............................. 2005-290078

(51) Int. Cl.
*F16H 31/00* (2006.01)
(52) U.S. Cl. ...................... 475/120; 477/156; 477/180
(58) Field of Classification Search ................. 475/120, 475/123, 125, 127; 477/156, 164
See application file for complete search history.

(56) References Cited

U.S. PATENT DOCUMENTS

| | | | |
|---|---|---|---|
| 4,742,732 A | | 5/1988 | Hiramatsu |
| 5,085,105 A | * | 2/1992 | Wakahara et al. ........... 477/148 |
| 5,429,561 A | * | 7/1995 | Wakahara et al. ........... 477/156 |
| 6,638,196 B2 | * | 10/2003 | Murasugi et al. ............ 477/156 |

FOREIGN PATENT DOCUMENTS

| | | |
|---|---|---|
| JP | 62-46055 A | 2/1987 |
| WO | WO 95/12774 | 5/1995 |

* cited by examiner

*Primary Examiner*—David D Le
*Assistant Examiner*—Derek D Knight
(74) *Attorney, Agent, or Firm*—Foley & Lardner LLP

(57) ABSTRACT

A multispeed automatic transmission includes first, second and third frictional elements and has first, second and third speed stages. The first frictional element is disengaged, engaged and disengaged when the transmission assumes the first, second and third speed stages respectively. The second speed stage is established by a first speed change, and the third speed stage is established by a second speed change. The second frictional element is engaged, disengaged and disengaged when the transmission assumes the first, second and third speed change states respectively. The third frictional element is disengaged, disengaged and engaged when the transmission assumes the first, second and third speed stages respectively. Upon judgment of need of a speed change from the first speed stage to the third speed stage, the second speed change is started while carrying out the first speed change, and comparison between a hydraulic pressure command value for the first frictional element at the first speed change and another hydraulic pressure command value for the first frictional element at the second speed change is made to select a smaller one, and the smaller value is practically applied to the first frictional element.

9 Claims, 16 Drawing Sheets

FIG.2

|      | LOW/C | 3-5R/C | H/C | L&R/B | 2-6/B | LOW/OWC |
|------|-------|--------|-----|-------|-------|---------|
| 1ST  | ○     |        |     | ⊗     |       | ◉       |
| 2ND  | ○     |        |     |       | ○     |         |
| 3RD  | ○     | ○      |     |       |       |         |
| 4TH  | ○     |        | ○   |       |       |         |
| 5TH  |       | ○      | ○   |       |       |         |
| 6TH  |       |        | ○   |       | ○     |         |
| REV  |       | ○      |     | ○     |       |         |

⊗ : ENGINE BRAKE

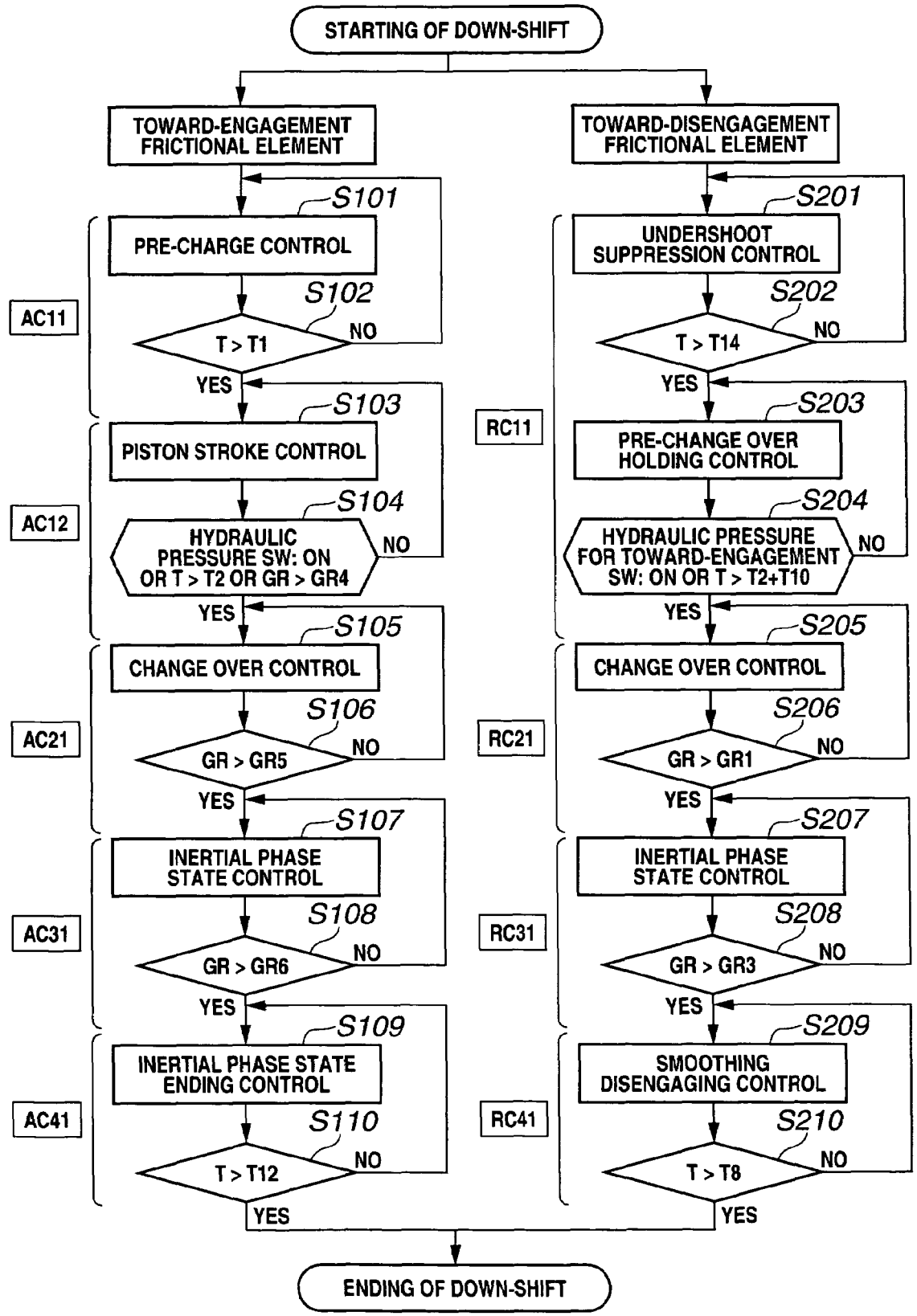

SEQUENTIAL DOWN-SHIFT (ENGAGEMENT → DISENGAGEMENT)

MULTISPEED AUTOMATIC TRANSMISSION

BACKGROUND OF THE INVENTION

1. Field of the Invention

The present invention relates in general to automatic transmissions for motor vehicles, and more particularly to multispeed automatic transmissions such as one having five or over five speeds. More specifically, the present invention is concerned with a control system of such multispeed automatic transmissions.

2. Description of the Related Art

With increase of speeds needed by an automatic transmission, the number of frictional elements, such as clutches and brakes installed in the transmission increases accordingly. Furthermore, with increase of the speeds, the speed change lines of a shift map become denser, and thus, in such multispeed automatic transmission, the actual speed change takes place much shortly or easily even in a small change in operation condition of the vehicle, that is, for example, a small change in throttle opening of the engine. Actually, as the distance of speed change lines becomes smaller, so-called two skip shift (for example, shift from $6^{th}$ speed to $3^{rd}$ speed) or three skip shift (for example, shift from $6^{th}$ speed to $2^{nd}$ speed) tends to occur frequently.

In current automatic transmissions, there is a type wherein a gate type speed change lever is installed for allowing the driver to positively select his or her desired speed disregarding the automatic shift of the transmission. Furthermore, for the same purpose, there is another type wherein a speed change paddle or button is arranged on a steering wheel. In the automatic transmissions of such types, the two or three skip shift takes place much frequently due to the nature of such positive shift by the driver.

Usually, in the automatic transmissions of such types, there is employed a speed control unit that exhibits a satisfied speed control in case of one skip shift in downshift direction (for example, shift from $4^{th}$ speed to $2^{nd}$ speed). Actually, in such one skip downshift, the speed change is carried out based on a given speed change control program memorized in a memory section of the control unit.

Thus, in case of the above-mentioned multispeed automatic transmissions, it is necessary to provide the control unit with a speed change control program that is suitable for various speed change patterns including one, two and three skip shifts. However, in this case, the control program becomes quite complicated and thus the amount of data to be handled by the control unit becomes enormous thereby causing usage of a large capacity storage in the control unit. Among the shifts including the skip shifts, a shift that is free of a speed change control program will be referred to as sequential shift in the following.

For eliminating the drawbacks mentioned hereinabove, various measures have been hitherto proposed in such type automatic transmissions, which are those disclosed in Japanese Laid-open Patent Application (Tokkaisho) 62-46055 and International Laid-open Patent Application 95/12774.

SUMMARY OF THE INVENTION

In the measures of Japanese Laid-open Patent Application, the speed change is sequentially carried out in case of the sequential shift. That is, for example, in case of shift from $5^{th}$ speed to $2^{nd}$ speed, one skip shift from $5^{th}$ speed to 3rd speed is carried out first and then shift from $3^{rd}$ speed to $2^{nd}$ speed is carried out. While, in the measures of International Laid-open Patent Application 95/12774, upon judgment of need of shift from a higher speed to a lower speed, the shift is carried out through an intermediate speed. Actually, during this shift, the shift from the intermediate speed to the lower speed is accelerated.

However, in the measures of Japanese Laid-open Patent Application, the frequency of the shifts actually made in the transmission inevitably increases as a difference between a current speed and a target speed increases. Of course, in this case, the driveablity of the transmission is deteriorated due to frequent shift shocks and increase of time needed until the target speed is established. For removing or at least weakening such undesirable phenomenon, the publication proposes usage of a higher hydraulic pressure in such sequent shift, so that the sequent shift can be finished in a relatively short time. However, in this case, usage of such higher hydraulic pressure tends to have the shift shocks much marked. Furthermore, in the measures of International Laid-open Patent Application 95/12774 wherein upon occurrence of synchronized rotation in the transmission, subsequent shift is started, and thus, there is such a possibility that a first shift is established by causing a friction element to change from OFF state to ON state, and a subsequent shift is established by causing the friction element to change from ON state to OFF state. However, hitherto, such shift pattern has been given little thought. As is easily known, if the speed change control is not carried out without considering such shift patter in detail, undesired shift shocks tend to occur.

Accordingly, an object of the present invention is to provide an automatic transmission which is free of the above-mentioned drawbacks even when the transmission is of a multispeed type.

More specifically, the present invention provides a multispeed automatic transmission, which can eliminate the above-mentioned drawbacks by speedily carrying out a sequential shift upon need with a minimum amount of date to be handled by a control unit.

In accordance with a first aspect of the present invention, there is provided an automatic transmission of a motor vehicle having first, second and third speed stages. The transmission comprises a first frictional element that is disengaged in the first speed stage, engaged in the second speed stage established by a first speed change and disengaged in the third speed stage established by a second speed change; a second frictional element that is engaged in the first speed stage, disengaged in the second speed stage and disengaged in the third speed stage; a third frictional element that is disengaged in the first speed stage, disengaged in the second speed stage and engaged in the third speed stage; and a control means that, upon judgment of need of a speed change from the first speed. stage to the third speed stage, starts the second speed change while carrying out the first speed change, carries out comparison between a hydraulic pressure command value for the first frictional element at the first speed change and another hydraulic pressure command value for the first frictional element at the second speed change to select a smaller one, and practically applies the smaller value to the first frictional element.

In accordance with a second aspect of the present invention, there is provided an automatic transmission of a motor vehicle having first, second and third speed stages. The transmission comprises a first frictional element that is disengaged in the first speed stage, engaged in the second speed stage established by a first speed change, and disengaged in the third speed stage established by a second speed change; a second frictional element that is engaged in the first speed stage, disengaged in the second speed stage and disengaged in the third speed stage; a third frictional element that is disengaged in the first speed stage, disengaged in the second speed stage and engaged in the third speed stage; a first speed change control means that, upon establishment of the first speed stage, outputs a hydraulic pressure command to cause the first frictional element to be engaged and the second frictional element to be disengaged; a second speed change control means that, upon establishment of the second speed stage, outputs a hydraulic pressure command to cause the first frictional element to be disengaged and the third frictional element to be engaged; judging means that judges a necessity of shift from the first speed stage to the third speed stage based on an operation condition of the vehicle; and a third speed change control means that induces starting of operation of the first speed change control means when the judging means judges the necessity of the shift and induces starting of the second speed change while carrying out the first speed change when a current gear ratio reaches a first predetermined gear ratio that is established prior to a time when an inertial phase state of the first speed change is ended or when a value of a parameter corresponding to the current gear ration reaches a value corresponding to the first predetermined gear ratio, wherein upon starting of the second speed change, the third speed change control means compares a hydraulic pressure command value for the first frictional element outputted from the first speed change control means and a hydraulic pressure command value for the first frictional element outputted from the second speed change control means to select a smaller one and practically applies the smaller one to the first frictional element.

In accordance with a third aspect of the present invention, there is provided an automatic transmission of a motor vehicle having first, second and third speed stages. The transmission comprises a first frictional element that is disengaged in the first speed stage, engaged in the second speed stage established by a first speed change and disengaged in the third speed stage established by a second speed change; a second frictional element that is engaged in the first speed stage, disengaged in the second speed stage and disengaged in the third speed stage; a third frictional element that is disengaged in the first speed stage, disengaged in the second speed stage and engaged in the third speed stage; and a speed change control means that, upon judgment of need of a speed change from the first speed stage to the third speed stage based on an operation condition of the vehicle, starts the second speed change prior to ending of the first speed change, wherein each of the first, second and third frictional elements is engaged when a hydraulic pressure command value issued from the speed change control means increases and disengaged when the hydraulic pressure command value decreases, and wherein upon starting of the second speed change prior to an ending of the first speed change, the speed change control means compares a hydraulic pressure command value for the first frictional element at the first speed change and a hydraulic pressure command value for the first frictional element at the second speed change to select a smaller one and practically applies the smaller one to the first frictional element.

BRIEF DESCRIPTION OF THE DRAWINGS

Other objects and advantages of the present invention will become apparent from the following description when taken in conjunction with the accompanying drawings, in which:

FIG. 2 is a table showing ON/OFF condition of various frictional elements for each speed employed in the automatic transmission;

FIG. 6 is a flowchart showing programmed operation steps executed by a control unit under the normal downshift;

DETAILED DESCRIPTION OF THE INVENTION

In the following, the present invention will be described in detail with reference to the accompanying drawings.

For ease of understanding, various directional terms, such as, right, left, upper, lower, rightward and the like are used in the following description. However, these terms are to be understood with respect to only a drawing or drawings on which corresponding element or portion is shown.

First, a multispeed automatic transmission to which the present invention is practically applied will be described with reference to FIG. 1.

Figure 1:
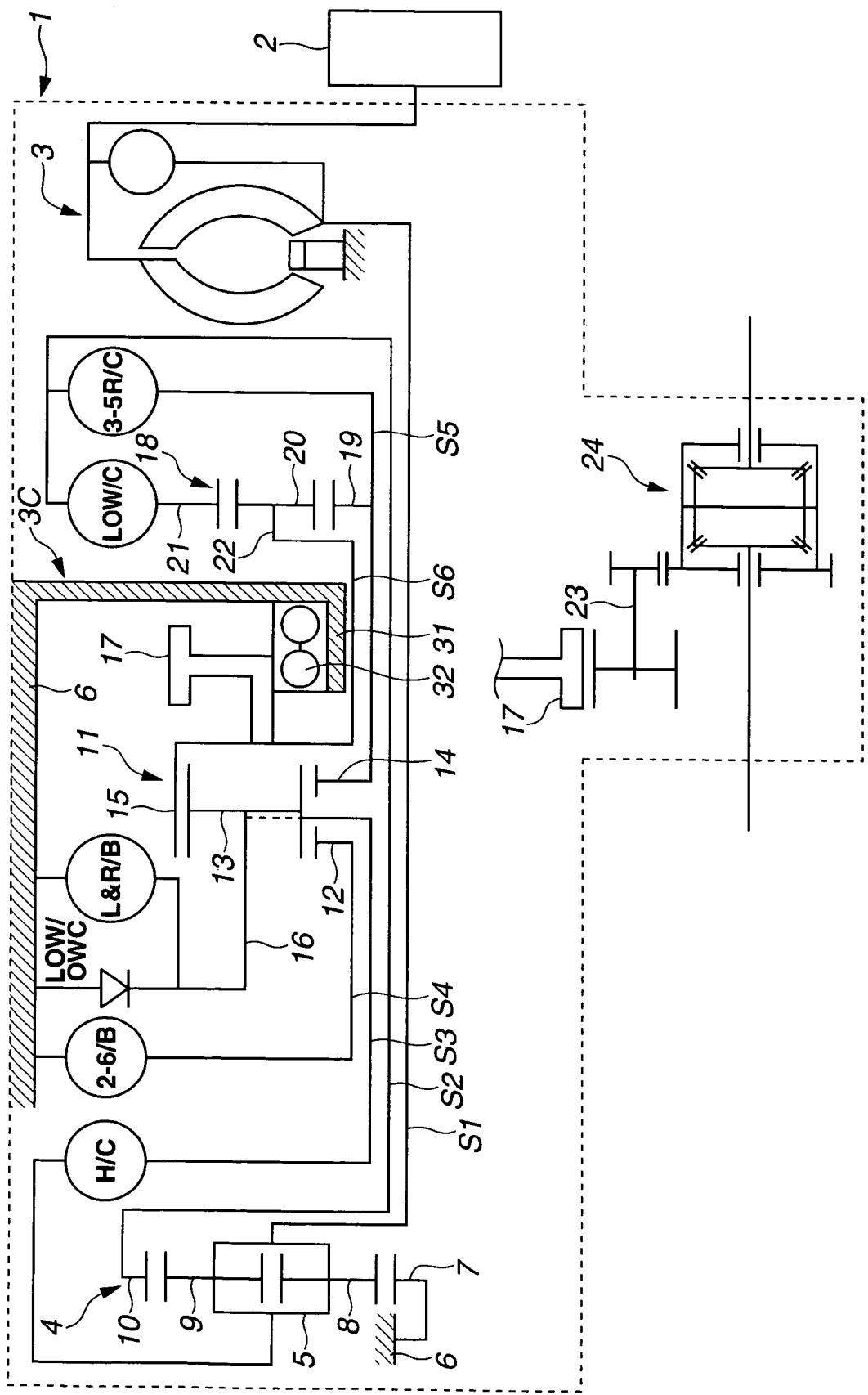
FIG. 1 is a schematic view of a six forward one reverse type automatic transmission to which the present invention is practically applied.

In FIG. 1, there is shown a six forward speed one reverse type automatic transmission 1 to which the present invention is practically applied. As is understood from the drawing, an engine power from an engine 2 is inputted to a torque converter 3 of the transmission. The power from the torque converter 3 is inputted through a first rotation shaft S1 to a carrier 5 of a double pinion type planetary gear unit 4 (or first planetary gear unit).

The double pinion type planetary gear unit 4 comprises a sun gear 7 secured to a transmission case 6, inside pinion gears 8 meshed with the sun gear 7, outside pinion gears 9 respectively meshed with the inside pinion gears 8, a ring gear meshed with the outside pinion gears 9 and concentrically arranged about the sun gear 7, and the above-mentioned carrier 5 operatively carrying the inside and outside pinion gears 8 and 9.

The ring gear 10 is connected to a second rotation shaft S2 that covers the first rotation shaft S1 and extends toward the engine 2 while passing through an after-mentioned output gear 17.

The carrier 5 is connected through a high clutch H/C to a third rotation shaft S3 that covers the second rotation shaft S2 and extends toward the engine 2.

A right end of the third rotation shaft S3, that is opposite to an end secured to the carrier 5, is secured to a carrier 16 that carries pinion gears 13 of a single pinion type planetary gear unit 11 (or second planetary gear unit). The carrier 16 is connected to the transmission case 6 through a low and reverse brake L&R/B and a low one way clutch LOW/OWC which are parallelly arranged.

With such arrangement, the carrier 16 is supported by the transmission case 6 in a manner to rotate in only one direction, and such one-way rotation of the carrier 16 can be selectively prevented (viz., locked) and permitted (viz., released).

The single pinion type planetary gear unit 11 comprises the pinion gears 13, a second sun gear 14 arranged at the side of the engine 2 and meshed with the pinion gears 13, a first sun gear 12 arranged at a side opposite to the engine 2 and meshed with the pinion gears 13 and a ring gear 15 meshed with the pinion gears 13.

As shown, the first sun gear 12 is connected to a fourth rotation shaft S4 that extends in a direction away from the engine 2 and covers the third rotation shaft S3. The fourth rotation shaft S4 is connected to the transmission case 6 through a 2-6 brake 2-6/B. With the function of the brake 2-6/B, the fourth rotation shaft S4 can take either a fixed state or a released state relative to the transmission case 6.

The second sun gear 14 is connected to a fifth rotation shaft S5 that covers the second rotation shaft S2 while extending toward the engine 2 through an interior the output gear 17. The fifth rotation shaft S5 is connected to the second rotation shaft S2 through a 3-5 reverse clutch 3-5R/C and connected to a ring gear 21 of a single pinion type planetary gear unit 18 (or third planetary gear unit) through a low clutch LOW/C.

The single pinion type planetary gear unit 18 is arranged about the fifth rotation shaft S5 at a position between the output gear 17 and the 3-5 reverse clutch 3-5R/C, and comprises a sun gear 19 connected to the fifth rotation shaft S5, a ring gear 21 arranged around the sun gear 19, pinion gears 20 meshed with the sun gear 19 and the ring gear 21, and a carrier 22 operatively carrying the pinion gears 20.

The carrier 22 is connected to a sixth rotation shaft S6 that covers the fifth rotation shaft S5 while extending toward the second planetary gear unit 11 through an interior of the output gear 17. The sixth rotation shaft S6 is connected to the ring gear 15 of the second planetary gear unit 11, as shown.

Between the second planetary gear unit 11 and the third planetary gear unit 18, there is arranged a bearing support portion 30. The bearing support portion 30 is a wall member integrally provided by the transmission case 6 and has a cylindrical bearing support portion 31 that extends along the sixth rotation shaft S6, as shown.

About the cylindrical bearing support portion 31, there is arranged a ball bearing 32 to which the output gear 17 connected to the ring gear 15 contacts.

Within the cylindrical bearing supporting portion 31, there are concentrically disposed the first, second, fifth and sixth rotation shafts S1, S2, S5 and S6.

In the automatic transmission 1 having the above-mentioned construction, an automatic speed change control for a six forward speeds is carried out at D-range position based on both an operating point determined by a vehicle speed and a throttle open degree and a speed change schedule (shift map), and a speed change control for one reverse is carried out when a select operation is made from D-range position to R-range position.

For the automatic speed change control described hereinabove, the high clutch H/C, the 2-6 brake 2-6/B, the low & reverse brake L&R/B, the low clutch LOW/C and the 3-5 reverse clutch 3-5R/C are controlled suitably in ON/OFF manner, so that the rotation of output power from the engine 2 is controlled to a desired speed and transmitted to drive road wheels (not shown) of a vehicle through the output gear 17, a countershaft 23 and a differential gear 24.

Referring to FIG. 2, there is shown a table that shows ON/OFF condition of the various frictional elements of the transmission 1 for establishing various speeds. In the table, sign "O" represents ON (engaged) condition, "no sign" represents OFF (disengaged) condition, "ⓧ" represents ON (engaged) condition that is effective at only engine brake, and "●" represents ON (engaged) condition that is mechanically achieved when the engine is driven.

As is understood from the table, in case of $1^{st}$ speed, the low clutch LOW/C is ON and the low and reverse brake L&R/B is ON. In this case, a rotation that is reduced in speed by passing through the input shaft (viz., first rotation shaft S1) and the first planetary gear unit 11 is inputted to the carrier 22 through the second rotation shaft S2, the low clutch LOW/C and the ring gear 21 of the second planetary gear unit 18. Furthermore, due to ON condition of the low one way clutch LOW/OWC, the rotation receives a counterforce by the carrier 16 fixed to the transmission case 6 causing the ring gear 15 to rotate at a reduced speed, so that the output gear 17 outputs a rotation that has been subjected to a maximum reduction. Under engine brake condition, the low and reverse brake L&R/B receives the counterforce in place of the low one way clutch LOW/OWC that is subjected to an idle rotation.

In case of $2^{nd}$ speed, the low clutch LOW/C is ON and the 2-6 bracket 2-6/B is ON. In this $2^{nd}$ speed, by engaging the 2-6 brake 2-6 brake 2-6/B, the first sun gear 12 and the pinion gear 13 become fixed to the transmission case 6. Due to the meshed engagement between the pinion gear 13 and the second sun gear 14, the fifth rotation shaft S5 connected to the second sun gear 14 becomes fixed to the transmission case 6.

In case of $3^{rd}$ speed, the 3-5 reverse clutch 3-5 R/C and the low clutch LOW/C are ON, and in case of $4^{th}$ speed, the high clutch H/C and the 3-5 reverse clutch 3-5R/C are ON. In case of $5^{th}$ speed, the high clutch H/C and the 305 reverse clutch 3-5R/C are ON.

In case of $6^{th}$ speed, the high clutch H/C and the 2-6 brake 2-6/B are ON. Like the above-mentioned $2^{nd}$ speed, by engaging the 2-6 brake 2-6/B, the fifth rotation shaft S5 becomes fixed. In case of reverse, the 3-5 reverse clutch 3-5R/C and the low and reverse brake L&R/B are ON.

In the following, a hydraulic circuit and an electronic speed change control will be described with reference to FIG. 3 of the drawings.

Figure 3:
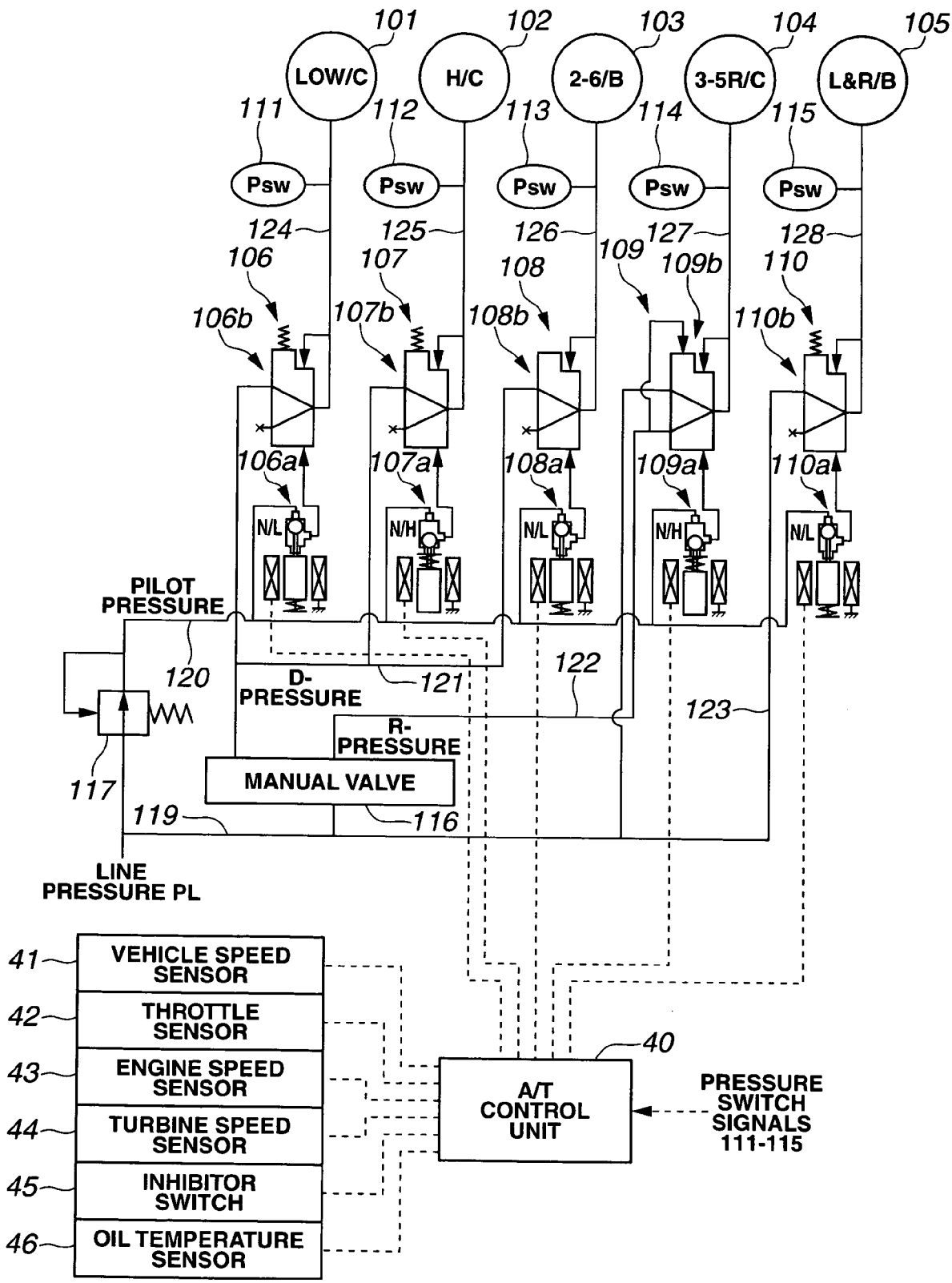
FIG. 3 is a block diagram showing a practical connection between a control unit, a hydraulic circuit and friction elements.

In FIG. 3, denoted by numeral 101 is an actuator piston chamber of the low clutch LOW/C, 102 is an actuator piston chamber of the high clutch H/C, 103 is an actuator piston chamber of the 2-6 brake 2-6/B, 104 is an actuator piston chamber of the 3-5 reverse clutch 3-5R/C, and 105 is an actuator piston chamber of the low and reverse brake L&R/B.

The low clutch LOW/C, the high clutch H/C, the 2-6 brake 2-6/B, the 3-5 reverse clutch 3-5R/C and the low and reverse brake L&R/B are turned ON (viz., engaged) when the corresponding actuator piston chambers 101, 102, 103, 104 and 105 are fed with an engaging pressure such as D-range pressure or R-range pressure, and such five frictional elements are turned OFF (viz., disengaged) when the engaging pressure is discharged from the chambers 101, 102, 103, 104 and 105.

It is to be noted that the D-range pressure is a line pressure passing through a manual valve and produced only when D-range is selected, and the R-range pressure is a line pressure passing through the manual valve and produced only when R-range is selected. Under a range other than the R-range, the R-range pressure is communicated with a drain port and decompression does not occur.

In FIG. 3, denoted by numeral 106 is a first pressure control valve that controls the hydraulic pressure led to the low clutch LOW/C, 107 is a second pressure control valve that controls the hydraulic pressure led to the high clutch H/C, 108 is a third pressure control valve that controls the hydraulic pressure led to the 2-6 brake 2-6/B, 109 is a fourth pressure control valve that controls the hydraulic pressure led to the 3-6 reverse clutch 3-5R/C and 110 is a fifth pressure control valve that controls the hydraulic pressure led to the low and reverse brake L&R/B.

The first pressure control valve 106 comprises a first duty solenoid 106*a* that, with usage of a pilot pressure as an initial pressure, produces a speed change control pressure with an aid of power of a solenoid and a first pressure regulating valve 106*b* that, with usage of the D-range pressure as an initial pressure, regulates a low clutch pressure by using the speed change control pressure and a feedback pressure as an operation signal pressure. The first duty solenoid 106*a* is controlled in accordance with a duty ratio. That is, when the solenoid is OFF, the low clutch pressure is 0 (zero), and when the solenoid is ON, the low clutch pressure increases with increase of the ON duty ratio.

The second pressure control valve 107 comprises a second duty solenoid 107*a* that, with usage of the pilot pressure as an initial pressure, produces a speed change control pressure with an aid of power of a solenoid and a second pressure regulating valve 107*b* that, with usage of the D-range pressure as an initial pressure, regulates a high clutch pressure by using the speed change control pressure and a feedback pressure as an operation signal pressure. When the second duty solenoid 107*a* is ON (viz., ON duty ratio is 100%), it causes the high clutch pressure to be 0 (zero), and with decrease of the ON duty ratio, the solenoid 107*a* causes the high clutch pressure to increase. While when the solenoid 107*a* is OFF, it causes the high clutch pressure to be maximum.

The third pressure control valve 108 comprises a third duty solenoid 108*a* that, with usage of the pilot pressure as an initial pressure, produces a speed change control pressure with an aid of power of solenoid and a third pressure regulating valve 108*b* that, with usage of the D-range pressure as an initial pressure, regulates a 2-6 brake pressure by using the speed change control pressure and a feedback pressure as an operation signal pressure. When the third duty solenoid 108*a* is OFF, it causes the 2-3 brake pressure to be 0 (zero), while when the solenoid 108*a* is ON, it causes the 2-3 brake pressure to increase with increase of the ON duty ratio.

The fourth pressure control valve 109 comprises a fourth duty solenoid 109*a* that, with usage of the pilot pressure as an initial pressure, produces a speed change control pressure with an aid of power of solenoid and a fourth pressure regulating valve 109*b* that, upon selection of D-range, with usage of the pilot pressure as an initial pressure, regulates a 3-5 reverse clutch pressure by using the speed change control-pressure and a feedback pressure as an operation signal pressure, and upon selection of R-range, with usage of R-range pressure as an operation signal pressure, feeds the line pressure (viz., R-range pressure) to the 3-5 reverse clutch 3-5R/C directly. That is, in the latter case, the R-range pressure becomes equal to the 3-5 reverse clutch pressure. When the fourth duty solenoid 109*a* is ON (viz., ON duty ratio is 100%), it causes the 3-5 reverse clutch pressure to be 0 (zero), and with decrease of the ON duty ratio, the solenoid 109*a* causes the 3-5 reverse clutch pressure to increase. While when the solenoid 109*a* is OFF, it causes the 3-5 reverse clutch pressure to be maximum.

The fifth pressure control valve 110 comprises a fifth duty solenoid 110*a* that, with usage of the pilot pressure as an initial pressure, produces a speed change control pressure with an aid of power of solenoid and a fifth pressure regulating valve 110*b* that, with usage of the line pressure as an initial pressure, regulates a low and reverse brake pressure by using the speed change control pressure and a feedback pressure as an operation signal pressure. When the fifth duty solenoid 110*a* is OFF, it causes a low and reverse brake pressure to be 0 (zero), while the solenoid 110*a* is ON, it causes the low and reverse brake pressure to increase with increase of the ON duty ratio.

In FIG. 3, denoted by numeral 111 is a first pressure switch (viz., hydraulic pressure detecting means), 112 is a second pressure switch (viz., hydraulic pressure detecting means), 113 is a third pressure switch (viz., hydraulic pressure detecting means), 114 is a fourth pressure switch (viz., hydraulic pressure detecting means), 115 is a fifth pressure switch (viz., hydraulic pressure detecting means), 116 is the above-mentioned manual valve, 117 is a pilot valve, 118 is a shuttle ball valve, 119 is a line pressure passage, 120 is a pilot pressure passage, 121 is a D-range pressure passage, 122 is a R-range pressure passage, 124 is a low clutch pressure passage, 125 is a high clutch pressure passage, 126 is a 2-6 brake pressure passage, 127 is a 3-5 reverse clutch pressure passage, and 128 is a low and reverse brake pressure passage.

As will be understood from the drawing, the low clutch pressure passage 124, the high clutch pressure passage 125, the 2-6 brake pressure passage 126, the 3-5 reverse clutch pressure passage 127 and the low and reverse brake pressure passage 128 are respectively provided with the first, second, third, fourth and fifth pressure switches 111, 112, 113, 114 and 115 for detecting ON/OFF condition of engaging pressure received in the passages. That is, each pressure switch 111, 112, 113, 114 or 115 issues ON signal upon sensing the pressure and issues OFF signal upon sensing no pressure.

In FIG. 3, denoted by numeral 40 is an automatic transmission control unit (viz., A/T control unit), 41 is a vehicle speed-sensor for detecting a speed of the vehicle, 42 is a throttle sensor (viz., torque representing signal producing means) for detecting a throttle valve open degree, 43 is an engine speed sensor for detecting a speed of the engine, 44 is a turbine speed sensor for detecting the speed of a turbine of the torque converter 3, 45 is an inhibitor switch and 46 is an oil sensor for detecting a pressure of oil in the transmission 1, which are combined to constitute an electronic speed change control system.

Upon receiving various information signals from the pressure switches 111, 112, 113, 114 and 115 and from the sensors 41, 42, 43, 44 and 46 and switch 45, the A/T control unit 40 processes such information signals in accordance with a predetermined speed change control rule and a fail-safe control rule and outputs suitable drive signals to the first, second, third, fourth and fifth duty solenoids 106a, 107a, 108a, 109a and 110a in accordance with the results of the processing.

The detail of the A/T control unit 40 will be described hereinafter.

In the following, a speed change control at the time of sequential shift, which is the feature of the present invention, will be described along with a normal speed change control.

As has been mentioned hereinabove, in a multispeed automatic transmission, the speed change lines of a shift map are densely set and thus, frequency in carrying out the skip shift is increased as compared in case of a commonly used automatic transmission. That is, during cruising of the vehicle having such multispeed automatic transmission installed therein, for example, so-called "two skip shift" from $4^{th}$ speed to $1^{st}$ speed and/or so-called "three skip shift" from $6^{th}$ speed to $2^{nd}$ speed tends to occur. Furthermore, due to intentional speed change operation by a driver, there is such case that the two skip shift and/or three skip shift is needed.

In the following, the sequential shift will be described in detail. It is to be noted that the sequential shift indicates a shift of skip shifts, of which speed change control is not programmed. More specifically, the sequential shift is of a skip shift, other than a downshift from "n-stage" to "n-2 stage". As will become apparent as the description proceeds, the sequential shift includes both a shift that is carried out over a plurality of stages based on crossing of the speed change lines of a shift map due to change of an operation condition of the vehicle and a shift that is carried out over a plurality of stages based on intentional speed change operation made by a driver through a speed change lever.

In the above-mentioned skip shifts, for one skip shift in a downshift direction, a speed change control data is previously programmed. That is, for example, in case of one skip shift from $4^{th}$ speed to $2^{nd}$ speed, a continuous speed change shift from $4^{th}$ speed, to $3^{rd}$ speed and to $2^{nd}$ speed is not carried out, but a direct downshift from $4^{th}$ speed to $2^{nd}$ speed is carried out.

While, for skip shift in an up-shift direction, a program that directly carries out the skip shift is not provided. That is, for example, in case of one skip shift from $2^{nd}$ speed to $4^{th}$ speed, a continuous speed change shift from $2^{nd}$ speed, to $3^{rd}$ speed and $4^{th}$ speed is carried out. This is because in case of skip shift in the up-shift direction, the driveablity of the transmission is not so deteriorated even if the speed change control is somewhat delayed as compared with case of skip shift in the downshift direction.

As is mentioned hereinabove, for the one skip shift in the downshift direction, a speed change control program is practically used. While, for the two skip shift from $4^{th}$ speed to $1^{st}$ speed, one skip shift from $4^{th}$ speed to $2^{nd}$ speed (viz., first speed change) and a subsequent shift from $2^{nd}$ speed to $1^{st}$ speed (viz., second speed change) have to be carried out continuously.

That is, in such case, a speed change "$4^{th}$ speed=>$2^{nd}$ speed=>$1^{st}$ speed" is carried out. However, in this case, as is understood from the table of FIG. 2, in the one skip shift (viz., first speed change) from $4^{th}$ speed (viz., first speed stage) to $2^{nd}$ speed (viz., second speed stage), the 2-6 brake 2-6/B is brought into ON condition, while in the subsequent shift (viz., second speed change) from $2^{nd}$ speed (viz., second speed stage) to $1^{st}$ speed (viz., third speed stage), the 2-6 brake 2-6/B is brought into OFF condition.

Accordingly, in the two skip shift from $4^{th}$ speed to $1^{st}$ speed, the 2-6 brake 2-6/B undergoes an engaging control at the first speed change and then, that is, when the second speed change is commenced, the 2-6 brake 2-6/B undergoes a release control in a sequential manner.

While in case of up-shift, since the program for the one skip shift is not provided, the continuous two speed changes are carried out even under execution of the one skip shift. That is, in case of speed change from $1^{st}$ speed to $3^{rd}$ speed, the 2-6 brake 2-6/B becomes engaged at the first speed change from $1^{st}$ speed to $2^{nd}$ speed, and the 2-6 brake 2-6/B becomes disengaged at the second speed change from $2^{nd}$ speed to $3^{rd}$ speed. Like this, in case of shift from $2^{nd}$ speed to $4^{th}$ speed and/or $4^{th}$ speed to $6^{th}$ speed, the 3-5 reverse clutch 3-5R/C is subjected to a change from ON to OFF.

In the following, a frictional element that is released at a first speed stage, engaged at a second speed stage established by a first speed change, and released at a third speed stage established by a second speed change will be referred to "first frictional element", and thus, the 2-6 brake 2-6/B at the speed change from $4^{th}$ speed to $1^{st}$ speed corresponds to the first frictional element. In case of up-shift, the 3-5 reverse clutch 3-5R/C at the speed change "$2^{nd}$ speed=>$3^{rd}$ speed=>$4^{th}$ speed" and "$4^{th}$ speed=>$5^{th}$ speed $6^{th}$=>speed" and the 2-6 brake 2-6/B at the speed change "$1^{st}$ speed=>$2^{nd}$ speed=>$3^{rd}$ speed" correspond to the first frictional element.

Figure 4:
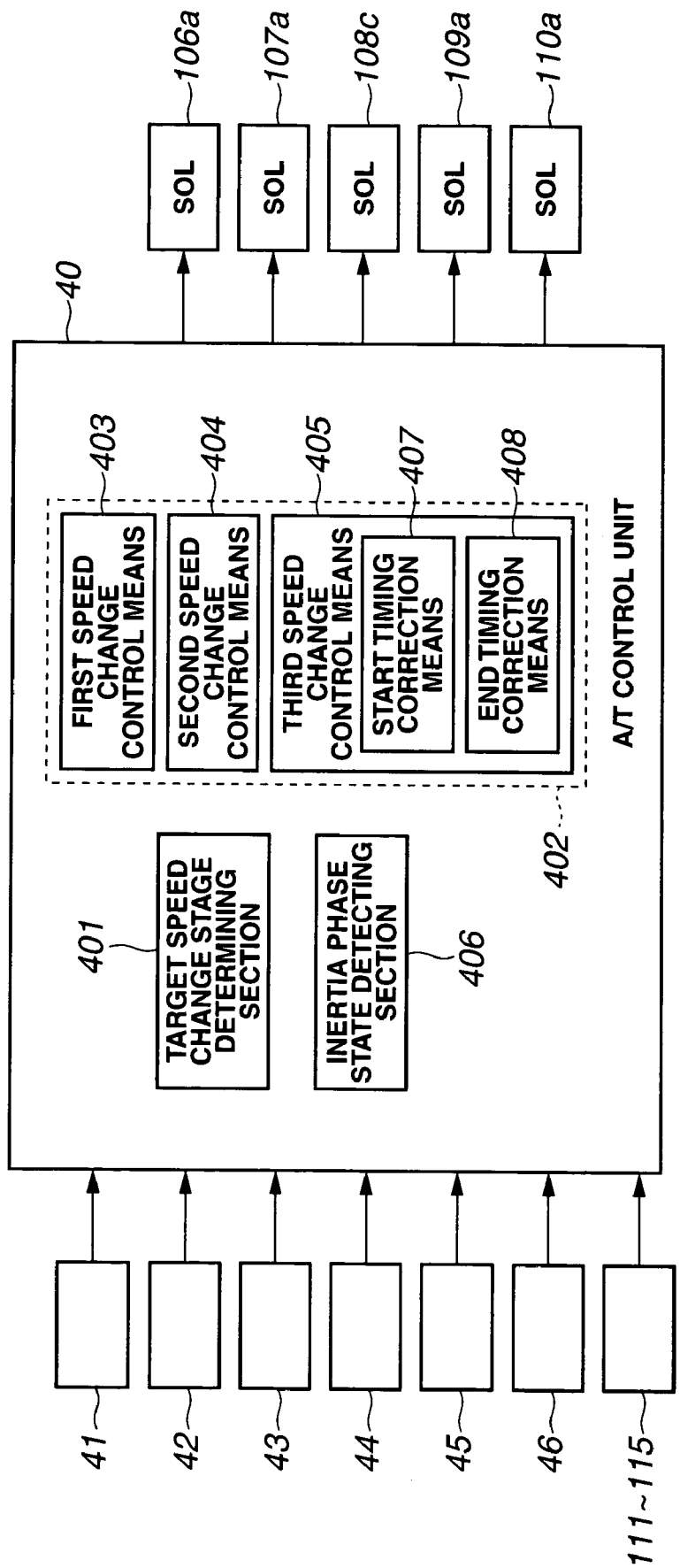
FIG. 4 is a block diagram showing essential sections of the control unit employed in the present invention.

In the following, the speed change control of skip shift that constitutes the feature of the invention will be described with reference to FIG. 4.

As is seen from the drawing, to an input section of the A/T control unit 40, there are connected the above-mentioned sensors and switches 41 to 46 and 111 to 115, and to an output section of the unit 40, there are connected the above-mentioned duty solenoids 106a to 110a.

The A/T control unit 40 comprises a target speed stage determining section 401, a speed change control section 402 and an inertia phase state start detecting section 406. Upon receiving various information signals from the sensors and switches 41 to 46 and 111 to 115, these sections 401, 402 and 406 process the information signals and feed the duty solenoids 106a to 110a with suitable drive signals.

The target speed stage determining section 401 functions to decide a target speed stage of the transmission in accordance with some of the information signals from the sensors and switches 41 to 46 and 111 to 115, which are for example, signals from the vehicle speed sensor 41, the throttle sensor 42, engine speed sensor 43, etc. The target speed stage determining section 401 is set in the A/T control unit 40 as a programmed shift map. The inertia phase state start detecting section 406 functions to calculate an actual gear ratio of the transmission 1 based on the information signals from the turbine speed sensor 44, etc., and further functions to detect a start timing of an inertial phase state based on the calculated actual gear ratio. The inertia phase state start detecting section 406 has an additional function to detect an end (or termination) of the inertial phase state. In other words, the inertial phase state start detecting section 406 serves as an inertia phase state start/end detecting section.

The speed change control section 402 generally comprises a first speed change control means 403, a second speed change control means 404 and a third speed change control means 405. The first speed change control means 403 functions to issue ON (or engaging) signal to the first frictional element and OFF (or disengaging) signal to the second frictional element at the above-mentioned first speed change, the second speed change control means 404 functions to issue OFF signal to the first frictional element and ON signal to the third frictional element at the second speed change.

The first and second speed change control means 403 and 404 are each provided with a control program (or control data) for each speed change pattern. That is, to a speed change wherein ±one shift is carried out from a current speed and to a speed change wherein one skip shift in a downshift direction is carried out, the control data stored in such first and second speed change control means 403 and 404 are used for executing the speed change control.

The third speed change control means 405 has the following function. That is, when a command for carrying out a speed change of two skip and/or over two skip shift in a downshift direction or when a command for carrying out a speed change of one skip shift in an up-shift direction is issued, the third speed change control means 405 forces the second speed change control means 404 to start the second speed change (viz., next speed change) before the end of the execution of the first speed change (viz., previous speed change) effected by the first speed change control means 403. More specifically, the second speed change control is started during the time when the execution of the first speed change is kept, and during the time when the execution of the first speed change and that of the second speed change are overlapped, adjustment of commands to the frictional elements is carried out for the purpose of optimizing the speed change control. As shown, the third speed change control means 405 is equipped with a start timing correction means 407 that corrects the timing for starting the second speed change and an end timing correction means 408 that corrects the timing for ending the first speed change.

In the following, a normal speed change that is a base for the speed change of sequential shift will be described. Although the normal speed change is well known in the art, the same will be described in detail for clarifying unique features of the sequential shift possessed by the present invention. As is described hereinabove, the normal speed change is the speed change that is executed by the control programs (control data) stored in the first and second speed change control means 403 and 404. That is, in case of downshift, a shift change "n=>n−1" or "n=>n−2" corresponds to the normal speed change, and in case of up-shift, a shift change "n=>n+1" corresponds to such normal speed change. It is to be noted that such normal speed change control is carried out by only the first speed change control means 403. For ease of description, such normal speed change control will be referred to as "independent speed change control".

Figure 5:
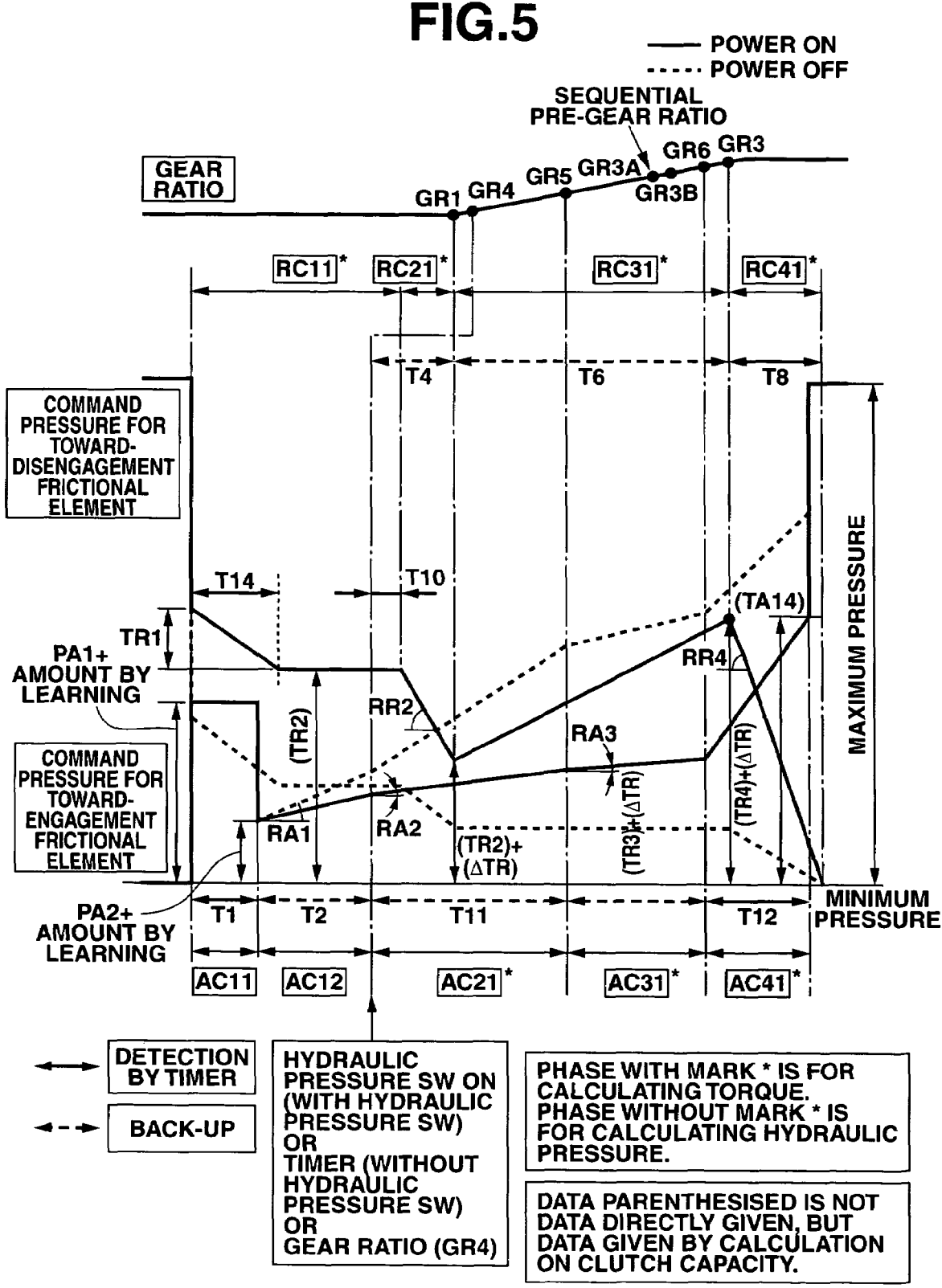
FIG. 5 is a time chart showing hydraulic pressure command applied to various frictional elements of the automatic transmission under a normal downshift.

In the following, a normal downshift will be described with reference to FIGS. 5 and 6. FIG. 5 is a time chart for explaining the normal downshift, and FIG. 6 is a flowchart for explaining programmed operation steps for the normal downshift.

When, under cruising with "n" speed (or first speed stage), the operation condition of the vehicle changes, the A/T control unit 40 sets the target speed to for example "n−1" speed (or second speed stage) with an aid of a shift map (viz., target speed stage determining section) 401 installed therein. Upon this, based on a control signal from the first speed change control means 493, a downshift from the "n" speed to "n−1" speed is actually started.

Upon starting of this downshift, the frictional elements that are going to be disengaged (which will be referred to "toward-disengagement frictional elements" in the following) are subjected to a pre-charge control (viz., lash suppressing control) as is indicated by reference "AC11" in FIGS. 5 and 6. This pre-charge control is a control for finishing a piston stroke as quick as possible. Actually, for such control, a high value command for hydraulic pressure is issued by the control unit 40 for establishing about 70% stroke of the piston. The high value command has a value consisting of a predetermined value PA1 and a value based on learning.

As is seen from the graph of FIG. 5, once the high value command is issued for a predetermined time "T1", the value of the command is lowered to a value (which consists of a predetermined value PA2 and a value based on learning) that induces a hydraulic pressure level to keep the lash suppressing condition after the pre-charge control for readying for the engagement of the frictional elements. This is depicted by steps S101 and S102 of the flowchart of FIG. 6. It is to be noted that the value of learning is determined based on a time needed for starting an inertia phase state and its change. rate.

As is seen from FIG. 5, once the time "T1" passes, a piston stroke control is started, which is indicated by reference "AC12" in the drawing. Under this piston stroke control, the piston stroke of a clutch of each of the toward-disengagement frictional elements is controlled by increasing the value of the command with a gradient "RA1" in accordance with an input torque inputted to the transmission. In this case, the gradient "RA1" is so determined as to keep the hydraulic pressure of the second frictional elements at a predetermined level (first hydraulic pressure value), and the gradient "RA1" is provided by paying attention to both a rising of the actual hydraulic pressure just after the piston stroke control and dispersion of the piston stroke, which is depicted by step S103 of the flowchart of FIG. 6. As will be described hereinafter, in case of power-on downshift, the speed change control is carried out with the frictional elements that are going to be engaged (which will be referred to "toward-engagement frictional elements" in the following), while, in case of power-off downshift, the speed change control is carried out with the toward-disengagement frictional elements. For this reason, the predetermined gradient "RA1" in the case of the power-on downshift is gentler than that in the case of the power-off downshift.

With such command for hydraulic pressure, the piston of each of the toward-disengagement frictional elements is gradually stroked under a predetermined hydraulic pressure value (first hydraulic pressure value), and once the piston stroke is completed, corresponding hydraulic pressure switch is turned ON. Upon sensing ON condition of the switch, the piston stroke control is finished and the operation enters the zone of "AC21" as shown in FIG. 5, which is depicted by step S104 of the flowchart of FIG. 6. As a backup means for the hydraulic pressure switch, a timer and monitoring of an actual gear ratio are used. Thus, even if detection of ON condition of the hydraulic pressure switch fails, the piston stroke control can be finished when a predetermined time "T2" has passed from the time when the piston stroke control started or the gear ratio reaches a predetermined gear ratio "GR4" that is higher than a gear ratio "GR1" that was shown when the inertia phase state started.

While, in the toward-engagement frictional elements, an undershoot suppression control is carried out at first, which is indicated by reference "RC11" in FIGS. 5 and 6. That is, once a downshift is started, the value of the hydraulic pressure command for such frictional elements is lowered to a value "TR2" that is set in accordance with the input torque inputted to the transmission. In this case, for suppressing an excessive drop of the hydraulic pressure (viz., undershoot), at the time when the speed change is actually started, a slightly high value command (+TR1) for hydraulic pressure relative to a target value TR2 is outputted, and thereafter, the value of the command is gradually lowered to the target value TR2 taking a predetermined time T14, which is depicted by steps S201 and S202 of the flowchart of FIG. 6.

In case of the power-on downshift, the target value TR2 for hydraulic pressure corresponds to a value suitable for starting the inertia phase state, that is a value suitable for inducing a slight clutch slippage of the toward-engagement frictional elements. While, in case of the power-off downshift, the target value TR2 corresponds to a value suitable for suppressing the clutch slippage of the toward-engagement frictional elements.

Once the predetermined time T14 passes, a so-called "pre-changeover holding control" starts, which is indicated by reference RC11 in FIGS. 5 and 6. In the power-off downshift, by the pre-changeover holding control, the hydraulic pressure is kept at the value TR2 until the end of the piston stroke of the frictional elements, so that the speed stage is held by the toward-engagement frictional elements, as is depicted by step S203 in the flowchart of FIG. 6.

If, under the power-off downshift, clutch off action is carried out in both the toward-engagement frictional elements and the toward-disengagement frictional elements, a neutral condition would take place inducing an idle running of the transmission. In order to avoid such undesirable phenomenon, the above-mentioned pre-changeover holding control is carried out.

Under the power-off downshift, a clutch slippage takes place due to holding the value TR2 of the hydraulic pressure. However, in such time, the speed stage is held by the toward-disengagement frictional elements. When thereafter the hydraulic pressure switch for the toward-disengagement frictional elements is turned ON (which means finishing of the piston stroke) or a predetermined time T2+T10 passes, the pre-changeover holding control is finished, which is depicted by step S204 of the flowchart of FIG. 6.

Once the operations AC11 and AC12 applied to the toward-disengagement frictional elements and the operation of RC11 applied t the toward-engagement frictional elements are finished, the operations of AC21 and RC21 are carried out for starting a so-called "gear changeover control".

In the gear changeover control, upon finishing of the piston stroke at the power-off downshift (which is detected by ON turning of the hydraulic pressure switch or expiration of time "T10+T12"), the hydraulic pressure applied to the toward-engagement frictional elements is lowered at a predetermined rate RR2 determined by the input torque, which is depicted by step S205 of the flowchart of FIG. 6. While, generally, in case of the power-on shift-down, an inertia phase state control (RC31) is started before operation of the gear changeover control. However, in case wherein due to irregularity of the hydraulic pressure and the like, the inertia phase state control fails to start, a back-up control is started by which the hydraulic pressure is reduced at the rate RR2 to promote starting of the inertia phase state control. When the gear ratio comes to a gear ratio GR1 for the inertia phase state control, the gear changeover control is finished, and the inertia phase state control is started as is depicted by step S206 the flowchart of FIG. 6.

While, in the toward-disengagement frictional elements, the hydraulic pressure command value is increased at a rate RA2 (step S105 of the flowchart of FIG. 6) that is determined in accordance with operation condition (viz., input torque, vehicle speed and the like) of the vehicle. The rate RA2 at the power-off downshift is so determined as to exhibit an optimum value thereof for each operation condition of the vehicle. That is, the rate RA2 is increased with increase of the input torque. In case of the power-on downshift, there is no need of capacity for the engagement so long as the piston stroke is finished, and thus, the rate RA2 is set to its minimum value. When the operation comes to a predetermined gear ratio GR5, the gear changeover control for the toward-disengagement frictional elements is finished and a subsequent inertia phase state control is started, which is depicted by step S106 of the flowchart of FIG. 6.

As is seen from the references AC31 and RC31 of FIG. 5, once, in case of the power-off downshift, the inertia phase state control is carried out, the hydraulic pressure command value for the toward-engagement frictional elements is lowered from a value at the time when the inertia phase state is detected, at a rate determined in accordance with the input torque and the vehicle speed. While, in case of the power-on downshift, the hydraulic pressure command value is increased at a rate determined in accordance with the input torque and the vehicle speed, and thus in case of the power-on downshift, the speed change progress is controlled by varying the hydraulic pressure applied to the toward-engagement frictional elements. By increasing the capacity of the clutch engagement, the drop of an output shaft torque is lowered and the speed change progress is delayed thereby to make the synchronization of the toward-disengagement frictional elements at the n-speed stage, which is depicted by step S207 of the flowchart of FIG. 6. When the gear ratio GR comes to a predetermined gear ratio GR3 that is near a gear ratio of the "n–1 stage", the inertia phase state control is finished, as is depicted by step S208 of the flowchart.

While, when, in the toward-disengagement frictional elements, the inertia phase state control starts, the hydraulic pressure for the frictional elements is increased at a rate RA3 that is determined in accordance with the input torque and the vehicle speed. In case of the power-off downshift, the rate is so made that the speed change operation from the middle state of the inertia phase state to the end of the same is gently progressed. While, in case of the power-on downshift, there is no need of the capacity of capacity for the engagement, and thus, the rate is set to its minimum value, as will be understood from step S107 of the flowchart. When the gear ratio GR comes to a predetermined gear ratio GR6 that is in front of the predetermined gear ratio GR3, the inertia phase state control is finished as is seen from step S108 of the flowchart.

Thereafter, the toward-disengagement frictional elements are brought to a so-called "inertia phase state ending control" that is indicated by reference AC41 in FIG. 5. In this inertia phase state ending control, the hydraulic pressure is increased to a predetermined value TA14, which is determined in accordance with the input torque, by taking a predetermined time T12, which is depicted by steps S109 and S110 of the flowchart. The predetermined hydraulic pressure value TA14 is a value for aiming assured setting of the n-speed stage and suppressing or at least minimizing a shift shock that would be induced by irregularity in detecting ending of the inertia phase state control.

When thereafter the predetermined time T12 passes, the hydraulic pressure command value is set to 100% to increase the hydraulic pressure to its maximum value, and then the speed change control by the toward-disengagement frictional elements is finished.

While, in the toward-engagement frictional elements, upon ending of the inertia phase state control, a so-called "smoothing disengaging control" (viz., RC41) is carried out. In this control, upon judgment of finishing of the inertia phase state control, the hydraulic pressure is lowered at a rate RR4 (viz., first predetermined rate) determined in accordance with the input torque, so that the hydraulic pressure is instantly reduced to the minimum value (zero pressure) while controlling fluctuation of the torque of the output shaft, which is depicted by step S209 of the flowchart of FIG. 6.

When a predetermined time T8 passes after the time when the hydraulic pressure has started to be reduced at the rate RR4, the hydraulic pressure command value is set to 0% thereby to produce the minimum hydraulic pressure finishing the speed change operation of the toward-engagement frictional elements.

As has been mentioned hereinabove, the downshift of the normal speed change control is carried out by the first speed change control means 403.

In the following, a speed change control in case of the sequential shift will be described in detail with reference to FIG. 8 which is a time chart at the time when a down shift from $4^{th}$ speed to $1^{st}$ speed is carried out. In the time chart, reference (a) indicates a throttle opening degree (TH), reference (b) indicates a forward/backward acceleration (G) of the vehicle, reference (c) indicates a gear ratio (GR) of the transmission and reference (d) indicates a hydraulic pressure command for inducing ON/OFF condition of each frictional element.

As is mentioned hereinabove, in such down shift from $4^{th}$ speed to $1^{st}$ speed, at the first speed change, one skip down shift from $4^{th}$ speed to $2^{nd}$ speed is carried out based on a programmed control data, and then at the second speed change, a down shift from $2^{nd}$ speed to $1^{st}$ speed is carried out. During the time from the first speed change to the second speed change, the 2-6 brake 2-6/B is subjected to a condition change from ON (engaged) to OFF (disengaged). Thus, the 2-6 brake 2-6/B corresponds to the first frictional element, the high clutch H/C corresponds to the second frictional element, and the low and reverse brake L&R/B corresponds to a third frictional element.

Figure 8:
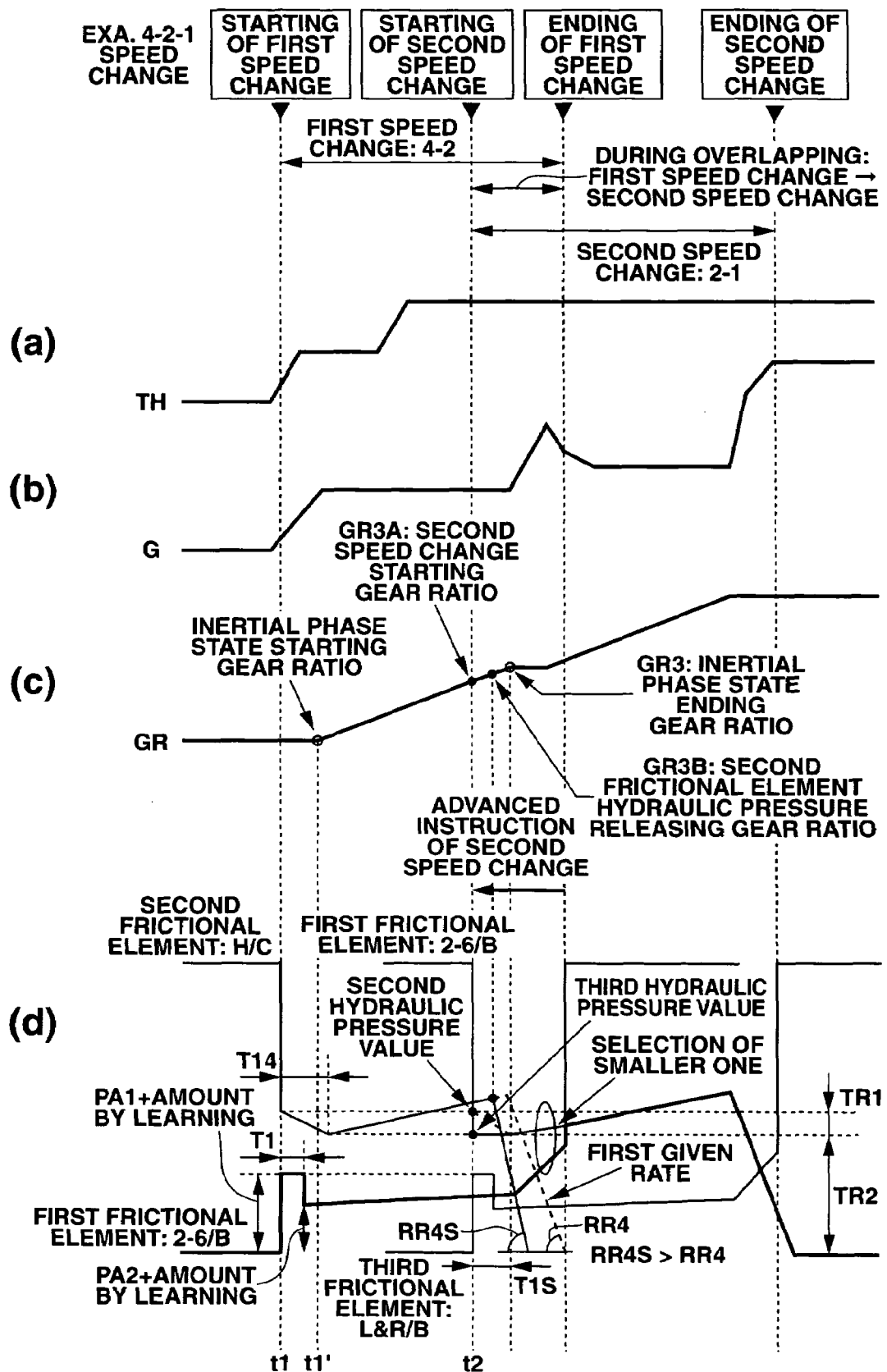
FIG. 8 is a time chart showing hydraulic pressure command applied to each frictional element of the automatic transmission when the transmission is subjected to a downshift that includes a shift from $4^{th}$ speed to $2^{nd}$ speed and a subsequent shift from $2^{nd}$ speed to $1^{st}$ speed, in which reference (a) indicates a throttle opening degree (TH), reference (b) indicates a forward/backward acceleration (G) of the vehicle, reference (c) indicates a gear ratio (GR) of the transmission and reference (d) indicates a hydraulic pressure command for ON/OFF condition of each frictional element.

When, due to change of running condition of the vehicle under $4^{th}$ speed cruising (viz., first speed stage) or due to intentional speed change operation by a driver, the target speed is set to $1^{st}$ speed (viz., third speed stage) by the target speed stage determining detecting section 401 (viz., shift map) installed in the A/T control unit 40, the one skip down shift (via., first speed change) from $4^{th}$ speed to $2^{nd}$ speed (viz., second speed stage) starts based on a control signal from the first speed change control means 403, as is indicated by reference "t1" of FIG. 8.

Then, comparison is carried out between a current actual gear ratio and a first predetermined gear ratio GR3A ($2^{nd}$ speed starting ratio or pre-gear ratio) that is provided before the time when a gear ratio GR3 (viz., inertia phase state ending gear ratio) for detecting the end of the one skip down shift from $4^{th}$ speed to $2^{nd}$ speed is provided.

When the current actual gear ratio does not reach the predetermined gear ratio GR3A (viz., second speed change starting ratio), the downshift from $2^{nd}$ speed to $1^{st}$ speed (second speed change) is not instantly carried out. That is, due to the work of the third speed change control means 405, starting of the second speed change control is suppressed. This is because an undesired interlock phenomenon tends to occur if the second speed change is carried out during the inertia phase state state. Thus, in order to avoid the interlock phenomenon, the starting of the second speed change is suppressed during the inertia phase state state.

When thereafter the gear ratio reaches the second speed change starting ratio GR3A, the suppression for the second speed change is cancelled and then due to the work of the second and third speed change control means 404 and 405, starting of a down shift from $2^{nd}$ speed to $1^{st}$ speed (second speed change) is commanded as is seen from reference t2 of FIG. 8.

The reason why the second speed change is forced to start before the end of the first speed change when the gear ratio comes to the second speed change starting ratio GR3A provided before the time when the inertia phase state ending gear ratio GR3 is provided is as follows. That is, if the second speed change is started after completion of the first speed change, a delay of hydraulic pressure for starting the second speed change occurs which tends to induce appearance of a so-called "dead period" between the ending of the first speed change and the starting of the second speed change, which results in increase of time needed for completing the speed change.

In view of the above-mentioned undesirable phenomenon, in the present invention, in case of the two skip or over two skip downshift, the following measures are employed. That is, when the gear ratio comes to second speed change starting gear ratio GR3A that is provided before the time when the inertia phase state ending gear ratio GR3 is provided, the second speed change is forced to start. That is, a so-called "earlier starting of the second speed change" is carried out in the present invention. The second speed change starting gear ratio GR3A is not a fixed value, but a value that varies each time such skip shift is carried out. That is, the second speed change starting gear ratio GR3A is determined by taking the possible response delay of the hydraulic pressure at the second speed change into consideration for the purpose of minimizing the dead period between the ending of the first speed change and the starting of the second speed change. More specifically, the second speed change staring gear ratio GR3A is set to a gear ratio that would take place at a time that is provided before, for example 0.1 second before the time when the inertia phase state ending gear ratio GR3 takes place.

Accordingly, the second speed change starting gear ratio GR3A is determined in accordance with the vehicle speed and various parameters of the speed stage of the second speed and the like. More specifically, as the vehicle speed decreases, a difference between the inertia phase state ending gear ratio GR3 and the second speed change starting ratio GR3A is increased. Furthermore, correction is so made that the difference is increased as the input torque inputted to the transmission increases. It is to be noted that such correction is carried out by the start timing correction means 407 installed in the speed change control section 402.

In the above-mentioned embodiment of the present invention, the second speed change starting ratio GR3A provided before the time when the inertia phase state ending gear ratio GR3 is selected as a parameter for starting the second speed change. However, if desired, in place of such gear ratio GR3A, another parameter that corresponds to the first predetermined gear ratio may be used in the present invention, which is for example the turbine speed of the torque converter 3, the speed of the output shaft of the transmission 1, and the speed of road wheels of the vehicle.

As is seen from reference "(d)" in FIG. 8, even when the gear ratio comes to the second speed change starting ratio GR3A (that is, t=t2'), the first speed change is not finished yet. Accordingly, in such time, the first speed change and the second speed change are forced to make a partial overlapping therebetween. During the time while the overlapping is made, OFF and ON instruction signals are applied to the 2-6 brake 2-6/B. That is, to one frictional element (viz., 2-6 brake 2-6/B), there are applied two different instruction signals.

In the present invention, in order to avoid the above-mentioned contradiction in control, the following measures are employed. That is, after starting of the second speed change, a hydraulic pressure command outputted from the first speed change control means 403 for controlling the 2-6 brake 2-6/B and another hydraulic pressure command outputted from the second speed change control means 404 for controlling the 2-6 brake 2-6/B are kept compared to select a smaller one that is actually applied to the third pressure control valve 108 of the 2-6 brake 2-6/B. This process is carried out in the third speed change control means 405.

With such control, the hydraulic pressure command for the 2-6 brake 2-6/B has such a characteristic as is depicted by the solid line indicated by reference (d) of the time chart of FIG. 8. That is, with such control, the two continuous speed changes can be connected through a slippage stage, and thus, undesired shift shock can be suppressed or at least minimized.

In the following, with reference to the flowcharts of FIGS. 7A and 7B in addition to the flowchart of FIG. 8, the sequential downshift will be described in detail. Basically, the first speed change (or former speed change) and the second speed change (or subsequent speed change) are the same as the speed change of the normal downshift except for a small part. Accordingly, operation steps of the flowcharts of FIGS. 7A and 7B that are the same as those of the flowchart of FIG. 6 are denoted by the same operation step numbers of FIG. 6, and redundant explanation on such same steps will be omitted from the following.

First, the former speed change will be described with reference to the flowchart of FIG. 7A. In this speed change, there is no difference in operation of the toward-disengagement frictional elements (viz., first frictional element, 2-6 brake 2-6/B) with respect to the normal speed change. That is, the same control as that in the normal speed change is carried out in the toward-disengagement frictional elements in the former speed change, which is depicted by steps S101 to S110 of the flowchart of FIG. 7A.

While, in the toward-engagement frictional elements (viz., second frictional element, high clutch H/C), only the steps S208 and S209 are changed. That is, once an after-mentioned second speed change starts, the hydraulic pressure command value for the disengaged engaged elements at the first speed change should be instantly reduced for avoiding a delay of the speed change operation.

Figure 7A:
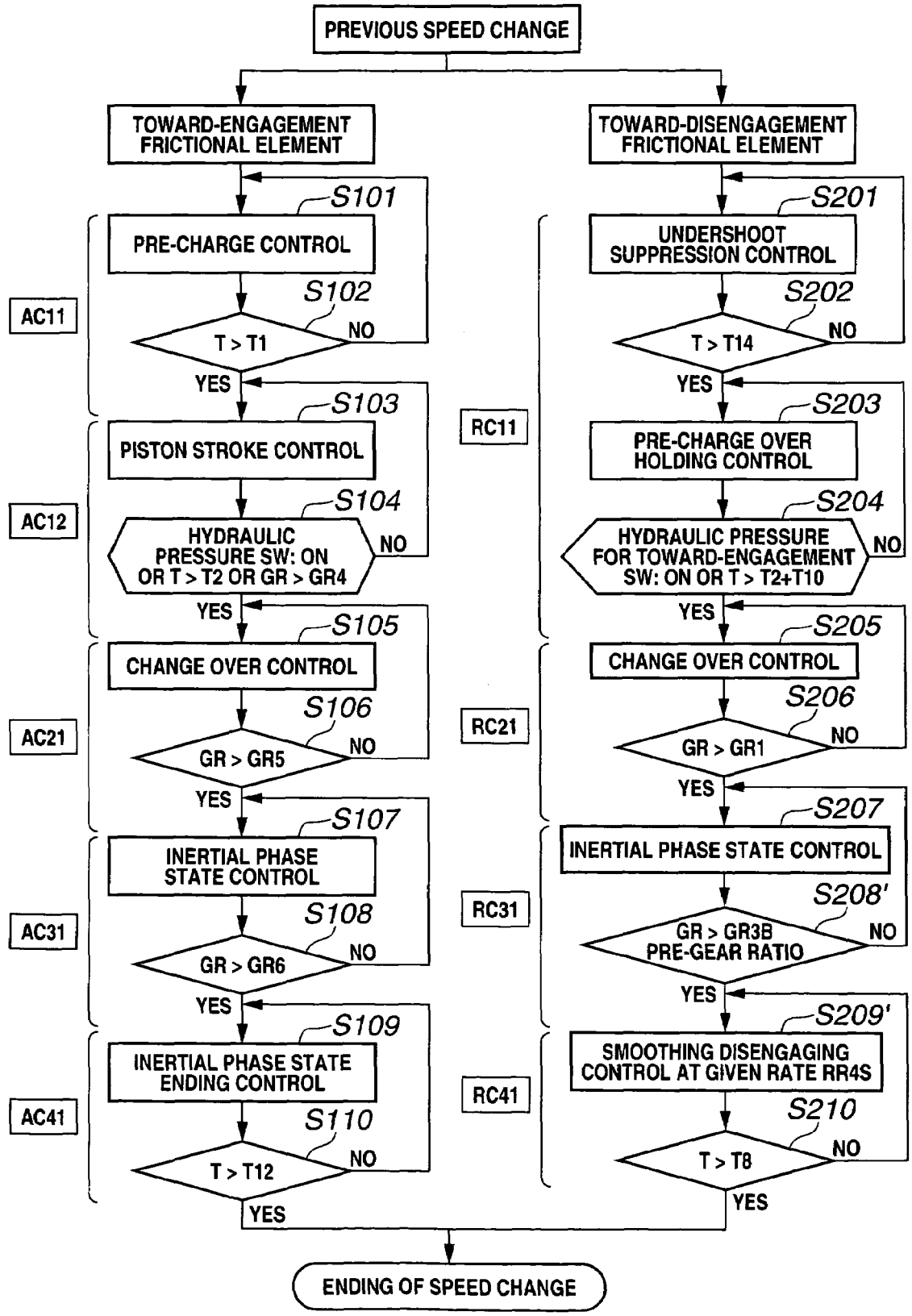
FIGS. 7A and 7B are flowcharts of programmed operation steps, which are provided for explaining different points with respect to the normal downshift of FIG. 6.

Thus, in the sequential shift, a correction operation is carried out wherein the hydraulic pressure for the H/C is rapidly reduced to the level 0 (zero), that is, at a timing much quick as compared with the normal downshift from $4^{th}$ speed to $2^{nd}$ speed, which are denoted by steps S208' and S209' of the flowchart of FIG. 7A. This correction operation is carried out by the end timing correction means 408.

More specifically, as is seen from FIG. 8, in such case, when the gear ratio comes to the second predetermined gear ratio GR3B provided before the time when the second gear ratio GR3 for judging the end of the inertia phase state control is provided, the hydraulic pressure is reduced at a rate RR4S, which is much higher than the first predetermined rate RR4, to the zero level. With this action, the release action of the high clutch H/C can be instantly made. Except the above, a normal second speed change, viz., the speed change from $2^{nd}$ speed to $1^{st}$ speed, is carried out based on the control program set in the A/T control unit 40, and then, the speed change to the $1^{st}$ speed is completed.

In this case, a correction is so made that the reducing rate of the hydraulic pressure increases as the input torque applied to the high clutch H/C increases. This is because the hydraulic pressure for the high clutch H/C is increased as the input torque increases which would induce increase of time that is needed for disengaging the high clutch H/C. As is known, if the disengagement of the clutch is not speedily made, a delay of the speed change tends to occur.

In the following, the subsequent speed change will be described with reference to the flowchart of FIG. 7B. As so in this speed change, there is no difference in operation of the toward- disengagement frictional elements (viz., third frictional element, low and reverse brake L&R/B) with respect to the normal speed change. That is, the same control as that in the normal speed change is carried out in the toward-disengagement frictional elements, which is depicted by steps S101 to S110 of the flowchart of FIG. 7B. That is, as is seen from the time chart of FIG. 8, the low and reverse brake L&R/B (viz., third frictional element) that is the toward-disengagement frictional element in the second speed change is applied with a hydraulic pressure command that has a characteristic similar to the pressure command applied to the 2-6 brake 2-6/B (viz., first frictional element) that is the toward-disengagement frictional element in the first speed change.

While, if, in the toward-engagement frictional elements (viz., first frictional element, 2-6 brake 2-6/B), a normal speed change control is applied, the second speed change control means 404 outputs a hydraulic pressure command so as to disengage the 2-6 brake 2-6/B. However, since, under this condition, the first speed change is not completed, a hydraulic pressure command from the first speed change control means 403 is kept applied to the 2-6 brake 2-6/B to engage the same. That is, during the overlap time between the first and second speed changes, two different control commands that are OFF and ON commands are applied to the 2-6 brake 2-6/B.

By the third speed change control means 405, a hydraulic pressure command outputted from the first speed change control means 403 for controlling the 2-6 brake 2-6/B and another hydraulic pressure command outputted from the second speed change control means 404 for controlling the 2-6 brake 2-6/B are compared to select a smaller one that is actually applied to the 2-6 brake 2-6/B. That is, a so-called "select-low control" is carried out, which is depicted by step S200 of the flowchart of FIG. 7B. This select low control is kept until completion of the first speed change.

Like in case of the above-mentioned first speed change, upon downshift from $2^{nd}$ speed to $1^{st}$ speed, the second speed change control means 404 functions to suppress undesired undershoot of the hydraulic pressure. That is, in such case, upon starting of the second speed change, the hydraulic pressure for the 2-6 brake 2-6/B is reduced sharply to a second hydraulic pressure command value (viz., second hydraulic pressure value TR2+TR1), and then, reduced to a third hydraulic pressure command value (viz., third hydraulic pressure value TR3: the upper limit of the hydraulic pressure value with which the 2-6 brake 2-6/B fails to make a torque transmission independently). While, when, like in the present invention, a third speed stage is set as a target speed stage after starting of the inertia phase state of the first speed change, the actual hydraulic pressure is lower than the third hydraulic pressure value and thus there is no fear about the undershooting of the hydraulic pressure. Thus, upon starting of the second speed change, the hydraulic pressure command value is sharply reduced to the third hydraulic pressure value, as is depicted by step S201' of the flowchart of FIG. 7B.

Figure 7B:
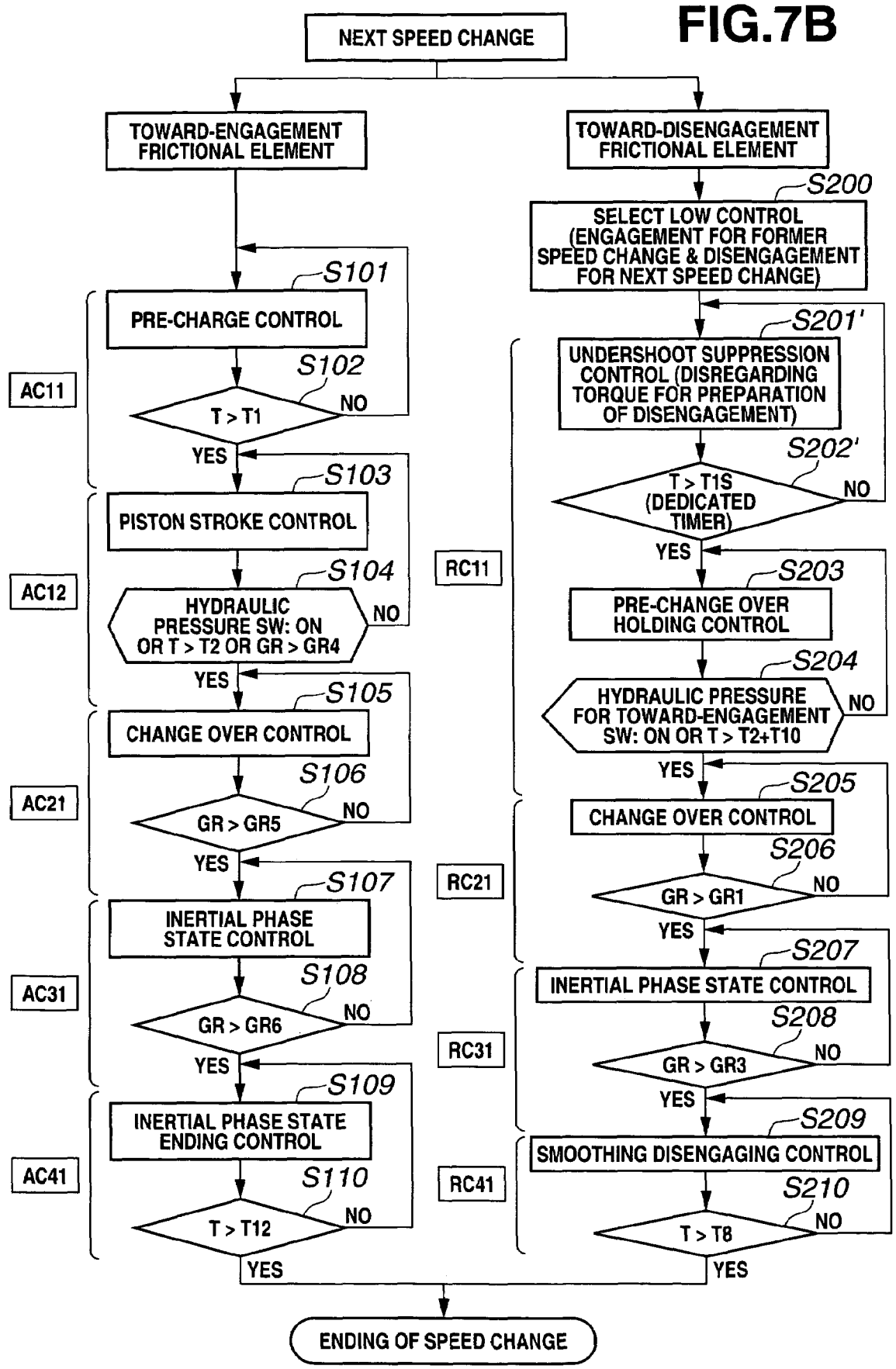

Then, the hydraulic pressure command value is held at the third hydraulic pressure value for a predetermined time T1S that is set for the subsequent speed change, as is depicted by step S202' of the flowchart of FIG. 7B, and then, like in the case of the toward-engagement frictional element (viz., High clutch H/C) at the first speed change, the hydraulic pressure command value is set to cause the hydraulic pressure to take a certain value and then upon ending of the inertia phase state, the hydraulic pressure command value is reduced to 0 (zero) completing the speed change control. The predetermined time T1S at step S202' is set shorter than the predetermined time T14 set in a normal downshift. This is because of reducing a time for which operation of gears in a middle speed stage is delayed.

As is described hereinabove, even in the sequential shift, an optimum speed change control is carried out based on control programs (viz., control data) that are stored in the first and second speed change control means 403 and 404. Thus, there is no need of providing a particular program for the sequential shift.

Furthermore, since the second speed change is started before ending of the first speed change, the time needed for achieving a final target speed stage can be shortened without raising the hydraulic pressure for the first frictional element (viz., 2-6 brake 2-6/B). That is, since the hydraulic pressure for the first frictional element is subjected to the above-mentioned "select-low control" once the overlap time passes, the hydraulic pressure can be continuously applied to the first frictional element without delay, and thus, the speed change can be smoothly made which suppresses or at least minimizes production of a shift shock.

Figure 9:
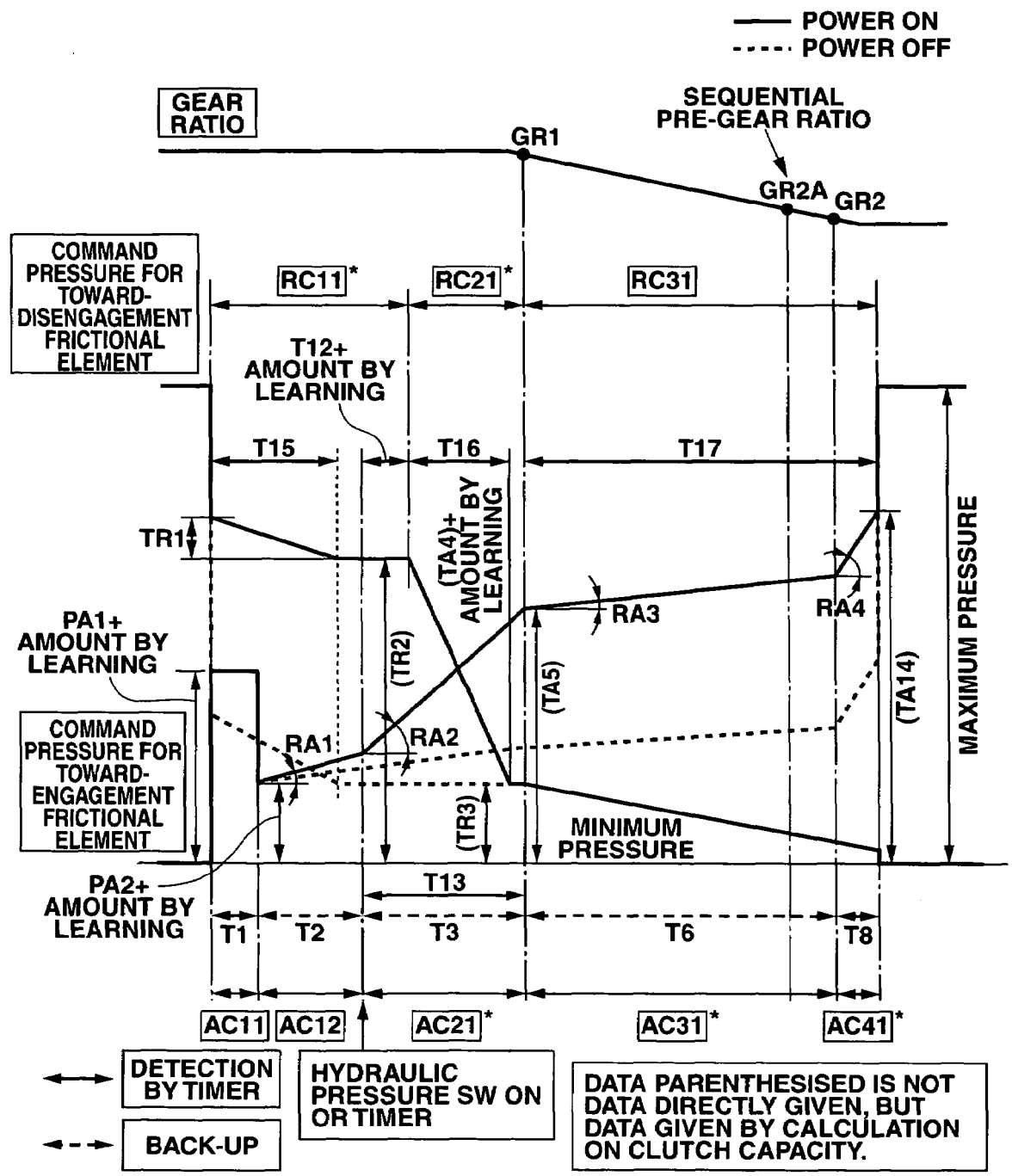
FIG. 9 is a time chart similar to FIG. 8, but showing a case in which the automatic transmission of the invention is subjected to a normal up-shift.

In the following, a normal up-shift speed change (viz., "n-stage" to "n+1 stage") will be described in detail with reference to FIGS. 9 and 10. FIG. 9 is a time chart for explaining the normal up-shift and FIG. 10 is a flowchart of the up-shift.

Figure 10:
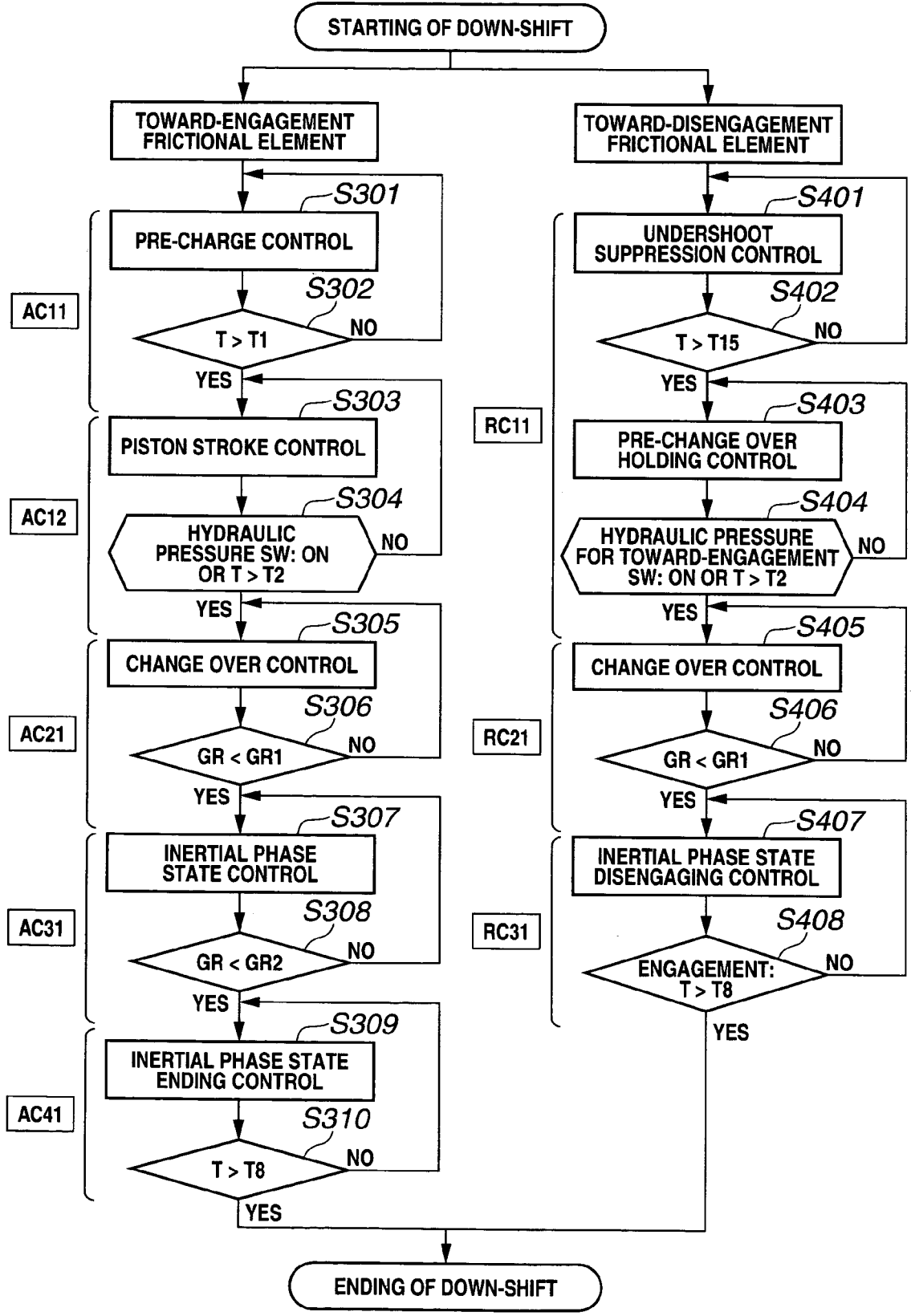
FIG. 10 is a flowchart showing programmed operation steps executed by the control unit under the normal up-shift.

Once the up-shift is started, a pre-charge control (or lash suppressing control) is carried out in the toward-disengagement frictional elements, which is depicted by reference AC11 of the time chart of FIG. 9 and steps S301 and S302 of the flowchart of FIG. 10, and thereafter, a piston stroke control is carried out, which is depicted by reference AC12 of the time chart and steps S303 and S304 of the flowchart. Since these pre-charge control and piston stroke control are substantially same as those in the above-mentioned downshift, detailed description of them will be omitted.

Then, a gear changeover control is started. In this control, the hydraulic pressure command value is increased at a rate RA2 previously set based on the input torque and the vehicle speed as is depicted by step S305 of the flowchart, and when the gear ratio comes to a predetermined gear ratio GR5, the gear changeover control is finished, and then an inertia phase state control is started, as is depicted by step S306 of the flowchart.

The rate RA2 is so set as to have an optimum lowering rate of the torque of the output shaft during the torque phase state condition, and the rate RA2 is increased as the input torque increases. With the rate RA2, a hydraulic surge and a shift shock that would be produced upon changing from the gear changeover control to the inertia phase state control are suppressed or at least minimized. If, in an power-off up-shift, the inertia phase state is detected before starting the gear changeover control, the inertia phase state control may be carried out.

Once the inertia phase state control is carried out, the hydraulic pressure is increased at a rate RA3 that is determined based on the input torque and the vehicle speed, as is depicted by step S307 of the flowchart of FIG. 10. The rate RA3 is smaller than the rate RA2 provided for the gear changeover control, and thus, increasing of the hydraulic pressure is gently made. When the gear ratio GR comes to the above-mentioned inertia phase state ending gear ratio GR3, the inertia phase state control is ended, as is depicted by step S308 of the flowchart.

Then, a so-called inertia phase state ending control is carried out which is depicted by reference AC41 of the time chart of FIG. 9. In this control, the hydraulic pressure is increased for a predetermined time T8 at a rate RA4 that is higher than the predetermined rate RA3. If the hydraulic pressure is instantly increased, detection of the ending of the inertia phase state is not effectively made causing undesired shift shock, and thus, the hydraulic pressure is increased in the above-mentioned manner, which is depicted by steps S309 and S310 of the flowchart of FIG. 10.

When the time T8 passes, the hydraulic pressure command value is set to 100% to increase the hydraulic pressure to its maximum value to finish the speed change control on the toward-disengagement frictional elements.

While, in the toward-engagement frictional elements, like in case of the downshift, an undershoot suppression control is carried out at first as is depicted by steps S401 and S402 of the flowchart, and then, a gear changeover control is carried out as is depicted by steps S403 and S404. That is, as is understood from FIG. 9, once the up-shift is started, the hydraulic pressure command value for the toward-engagement frictional elements is reduced to the predetermined value TR2. In this case, for suppressing excessive undershooting of the hydraulic pressure, at the time when the speed change is started, there is outputted a hydraulic pressure command value (TR2+TR1) that is slightly higher than the target value "TR2", and thereafter, the hydraulic pressure command value is gradually reduced to the target value TR2 by taking a predetermined time T15. It is to be noted that the target value "TR2" is a critical value set for suppressing undesired slippage of the clutch.

Upon expiration of the time T15, the gear changeover control is carried out. In this case, a pressure drop takes place and at the same time a clutch capacity is reduced while advancing the speed change operation. In a power-off up-shift, a fixed hydraulic pressure command value TR3 that is lower than TR2 is used in place of the value TR2.

Then, a gear changeover control is started as is depicted by reference RC21 in FIGS. 9 and 10. In this control, when a predetermined time T16 passes, the hydraulic pressure command value comes to the value TR3 provided at the power-off up-shift, and then the hydraulic pressure command value is gradually reduced at a certain rate, as is depicted by step S405 of the flowchart.

When the hydraulic pressure command value comes to the value TR3 upon expiration of the time T16, the value TR3 is kept until a time when the gear ratio comes to the inertia phase state judging gear ratio GR1, and thereafter, a so-called "inertia phase state removed control" is started. When the gear ratio comes to the inertia phase state judging gear ratio GR1 before expiration of the predetermined time T16, the inertial phase state removed control is instantly started, as is depicted by step S406 of the flowchart.

Once the inertial phase state removed control is started, the hydraulic pressure command value is gradually reduced at a rate that causes the hydraulic pressure to be 0 (zero) upon expiration of a predetermined time T17, as is depicted by step S407. Providing the time T17 for the gentle reduction in the hydraulic pressure brings about a smoothed speed change without a shift shock.

When thereafter a predetermined time T8 passes, the hydraulic pressure command value becomes 0 (zero) and thus the speed change is finished, as is depicted by step S408 of the flowchart.

As is described hereinabove, normal up-shift speed change control is carried out by the first speed change control means 403.

In the following, another sequential shift, for example, an up-shift "$2^{nd}$ speed=>$3^{rd}$ speed=>$4^{th}$ speed" will be described with reference to the time chart of FIG. 12. Like in FIG. 8, reference (a) indicates a throttle opening degree TH, reference (b) indicates a forward/backward acceleration G, reference (c) indicates a gear ratio GR and reference (d) indicates a hydraulic pressure command for inducing ON/OFF condition of each frictional element.

In such up-shift, the 3-5 reverse clutch 3-5 R/C is subjected to a status change from ON condition to OFF condition. Thus, the 3-5 reverse clutch corresponds to the first frictional element. And the 2-6 brake 2-6/B corresponds to the second frictional element.

When, under cruising in $2^{nd}$ speed (first speed stage), the running condition of the vehicle changes or a driver handles a speed change lever for intentional speed change, a target speed is set to for example $4^{th}$ speed due to the function of the target speed change detecting section 401 (or shift map). Upon this, an up-shift from $2^{nd}$ speed to $3^{rd}$ speed (first speed change) is started based on the control signal from the first speed change control means 403, as is depicted by reference t1 of FIG. 12.

Since the first speed change (viz., former speed change) is substantially same as that already mentioned in the normal up-shift, explanation of the first speed change will be omitted.

Figure 12:
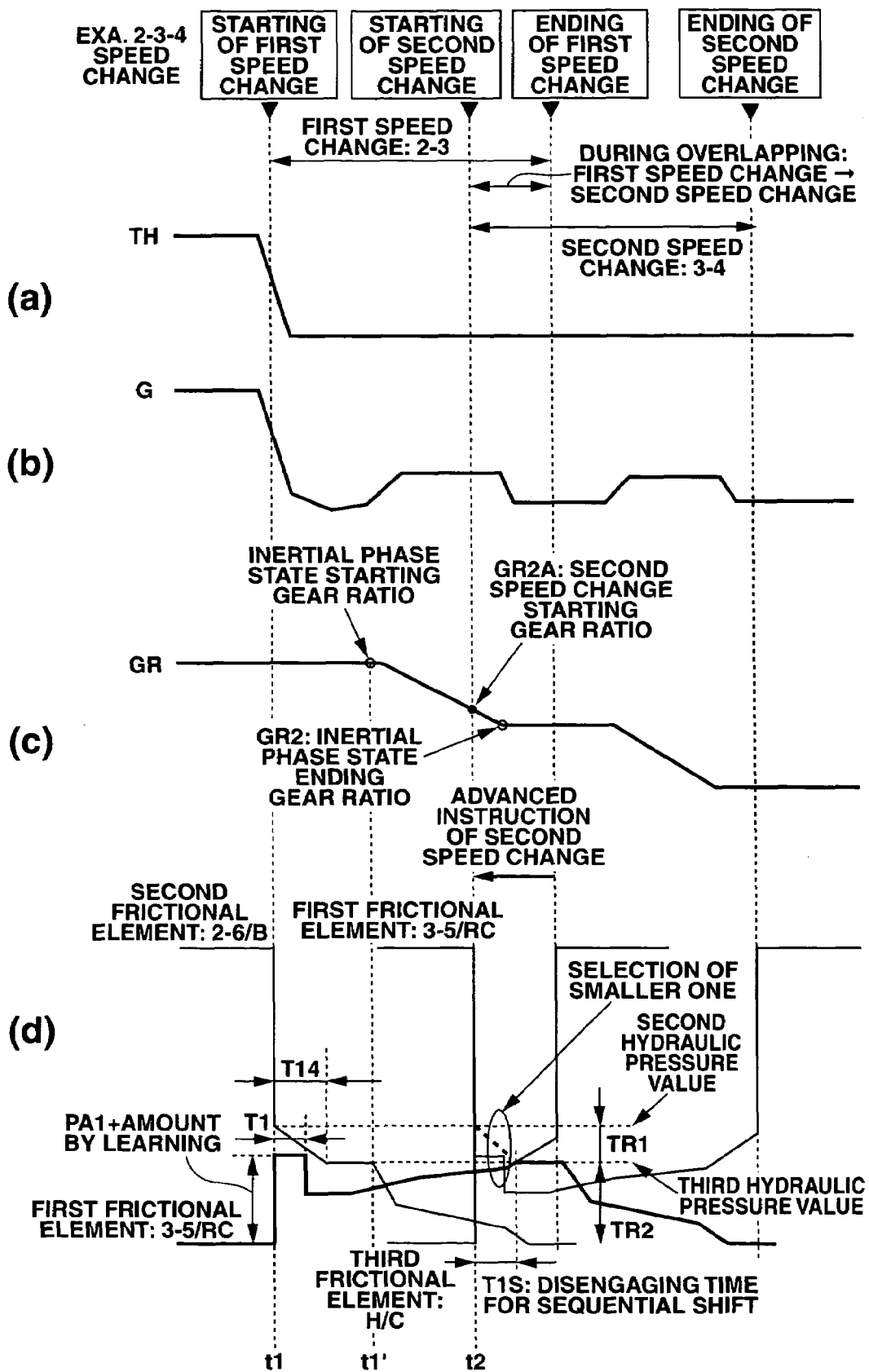
FIG. 12 is a time chart showing hydraulic pressure command applied to each frictional element of the automatic transmission when the transmission is subjected to an up-shift that includes a shift a shift from $2^{nd}$ speed to $3^{rd}$ speed and a subsequent shift from $3^{rd}$ speed to $4^{th}$ speed, in which (a) shows a command for a throttle opening degree (TH), (b) for a forward/backward acceleration (G) of the vehicle, (c) for a gear ratio (GR) of the transmission and (d) for ON/OFF condition of each frictional element.

Upon progress of this former speed change, the gear ratio starts to change from the $2^{nd}$ gear ratio toward $3^{rd}$ speed gear ratio, which is a starting of an inertia phase state as is depicted by reference t1' of the time chart of FIG. 12. Upon judgment of the starting of the inertia phase state, comparison is carried out between a current actual gear ratio and a first predetermined gear ratio GR2A (second speed change starting gear ratio or pre-gear ratio) that is provided before the time when a gear ratio GR2 (viz., inertia phase state ending gear ratio) for detecting the ending of the speed change (first speed change) from $2^{nd}$ speed to $3^{rd}$ speed is provided.

When the current actual gear ratio does not reach the second speed change starting gear ratio GR2A, the second speed change is not instantly carried out. That is, due to the work of the third speed change control means 405, starting of the second speed change control is suppressed. When thereafter the actual gear ratio reaches the gear ratio GR2A, the suppression for the second speed change is cancelled like in case of the above-mentioned down shift, and then due to the work of the third speed change control means 405, starting of the up-shift from $3^{rd}$ speed to $4^{th}$ speed (second speed change) is commanded as is depicted by reference t2 of the time chart of FIG. 12.

The reason why the second speed change is forced to start before the end of the first speed change when the gear ratio comes to the second speed change starting ratio GR2A provided before the time when the inertia phase state ending gear ratio is provided is the same as the reason that has been mentioned hereinabove in the section of the downshift. That is, if the second speed change is started after completion of the first speed change, a delay of hydraulic pressure for starting the second speed change would occur which tends to induce appearance of the so-called "dead period" between the ending of the first speed change and the starting of the second speed change, which results in increase of time needed for completing the speed change.

Accordingly, in the invention, when the actual gear ratio comes the second speed change starting gear ratio GR2A provided before the inertia phase state ending gear ratio GR2, the second speed change is forced to start. That is, a so-called "earlier starting of the second speed change" is carried out in the invention.

Like in case of the above-mentioned downshift, the second speed change starting gear ratio GR2A is not a fixed value, but a value that varies each time such skip shift is carried out. That is, the second speed change starting gear ratio GR2A is determined by taking the possible response delay of the hydraulic pressure at the second speed change into consideration for the purpose of minimizing the dead period between the ending of the inertia phase state and the starting of the second speed change. That is, the first predetermined gear ratio is previously set by taking the response delay of the second speed change for achieving a coincidence of the starting of the second speed change with the ending of the inertial phase state. More specifically, the second speed change starting gear ratio GR2A is so set as to cause the time from the starting (t2) of the second speed change to the ending of the inertia phase state to have a certain value.

Since the method of determining the second speed change starting gear ratio GR2A is substantially the same as that of the second speed change gear ratio GR3A in the above-mentioned downshift, explanation of the method and correction will be omitted.

When, at t=t2, the second speed change is started, a hydraulic pressure command for disengaging the 3-5 reverse clutch 3-5R/C (first frictional element) is outputted. However, since, under this case, the first speed change is not finished, a hydraulic pressure command for engaging the 3-5 reverse clutch 3-5R/C in the first speed change is kept outputted. That is, during the overlap time between the starting (t2) of the second speed change and the ending (t3) of the first speed change, OFF and ON control signals are applied to the single frictional element (viz., 3-5 reverse clutch 3-5R/C). That is, to one frictional element (viz., 3-5 reverse clutch 3-5R/C), there are applied two different instruction signals.

In the invention, in order to avoid the above-mentioned contradiction in control, the following measures are employed. That is, after starting of the second speed change, a hydraulic pressure command outputted from the first speed change control means 403 for controlling the 3-5 reverse clutch 3-5R/C and another hydraulic pressure command outputted from the second speed change control means 404 for controlling the 3-5 reverse clutch 3-5R/C are kept compared by the third speed change control means 405 to select a smaller one that is actually applied to the pressure control valve 109 of the 3-5 reverse clutch 3-5R/C.

With such control, the hydraulic pressure command for the 3-5 reverse clutch 3-5R/C has such a characteristic as is depicted by the solid line indicated by reference (d) of the time chart of FIG. 12. That is, with such control, the two continuous speed changes can be smoothly connected, and thus, like in case of the downshift, undesired shift shock is suppressed or at least minimized.

In the following, with reference to the flowchart of FIG. 11 and FIG. 12, the sequential up-shift will be described in detail. As is described hereinabove, the first speed change (or former speed change) is the same as the normal up-shift speed change, and thus, explanation on the first speed change will be omitted.

The second speed change (subsequent speed change) is basically the same as the normal up-shift speed change, and thus, the control for the toward-disengagement frictional elements at the first speed change is the same. While, the speed change control for the toward-engagement frictional elements is substantially the same as the normal up-shift speed change control except that in this case, in place of steps S401 and S402 of the flowchart in the afore-mentioned normal up-shift speed change control of FIG. 10, steps S401'and S402'are employed as are shown in the flowchart of FIG. 11.

Figure 11:
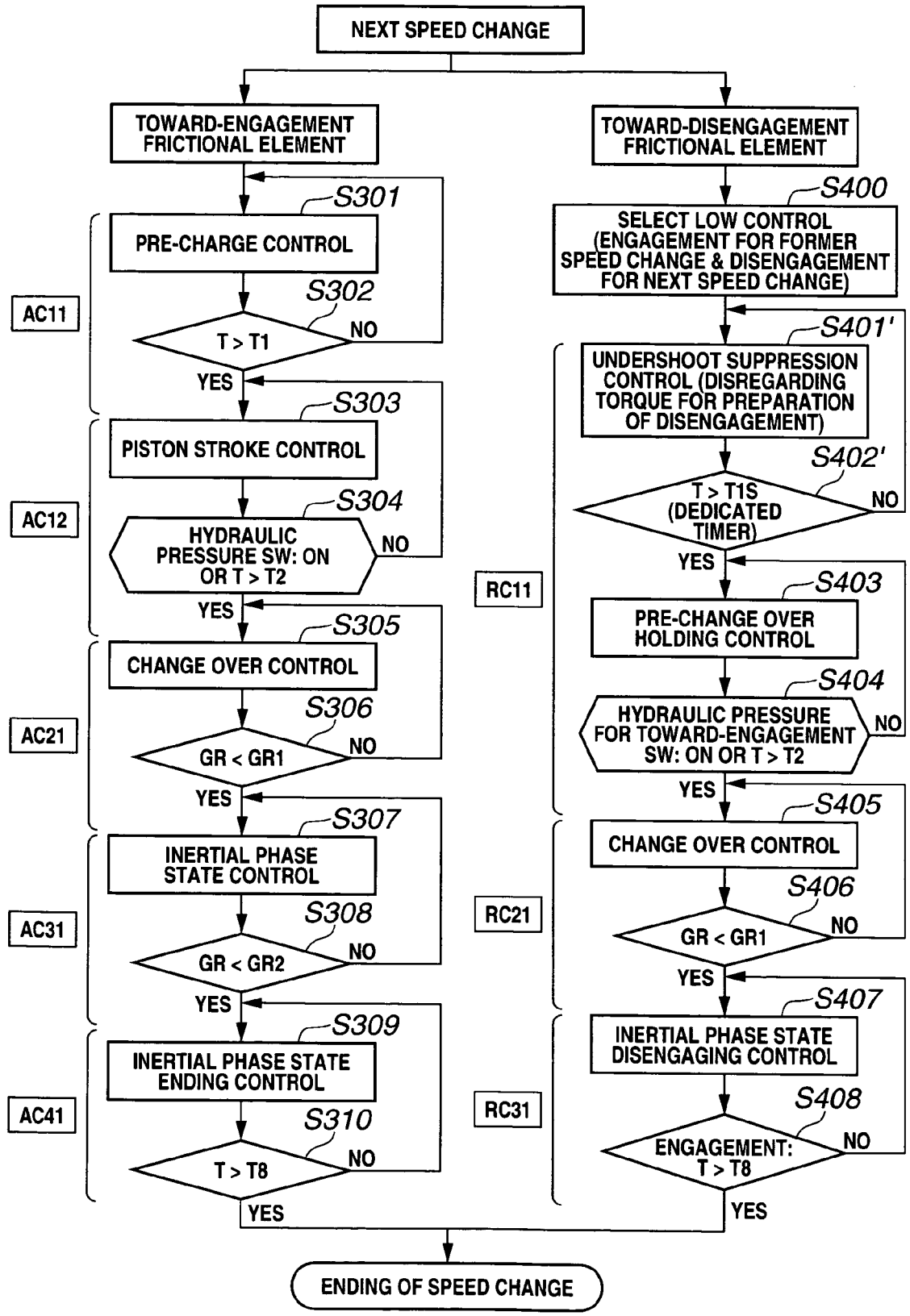
FIG. 11 is a flowchart of programmed operation steps, which is provided for explaining different points with respect to the normal up-shift of FIG. 10.

Accordingly, programmed operation steps of the flowchart of FIG. 11 that are the same as those of the flowchart FIG. 10 are denoted by the same operation step numbers of FIG. 10, and redundant explanation on such same steps will be omitted from the following.

When the first predetermined gear ratio GR2A (second speed change stating gear ratio or pre-gear ratio) is detected, the second speed change control means 404 starts the second speed change. Upon starting of the second speed change, a hydraulic pressure command value for the first frictional gear (viz., 3-5 reverse clutch 3-5R/C) and a hydraulic pressure command value kept at the first speed change are compared by the third speed change control means 405 to select a smaller one (viz., select-low control), which is depicted by step S400 of the flowchart of FIG. 11.

In the second speed change control means 404, the undershoot suppression control (see step S401 of the flowchart of FIG. 10) that has been carried out in the former speed change is disregarded, as is depicted by step S401' of the flowchart of FIG. 11. That is, in this step S401', the hydraulic pressure command value is instantly lowered to a predetermined command value TR2 that is determined based on the input torque, as is shown by the solid line (d) of FIG. 12 that shows a characteristic of the pressure applied to the toward-engagement frictional element at the second speed change.

The reason of such instant lowering of the hydraulic pressure command value is that the actual pressure for controlling the toward-engagement frictional elements (viz., the first frictional element, 3-5 reverse clutch 3-5R/C) has been controlled in the former speed change and thus shows a lower value. Accordingly, even when the hydraulic pressure command value is instantly reduced to the target value in the subsequent speed change, the hydraulic pressure is not subjected to undershooting.

The difference between step S401' at the subsequent speed change and step S401 at the former speed change is that in the step of the former speed change, the hydraulic pressure command value is "TR2+TR1" and in the step of the subsequent speed change, the hydraulic pressure command value is "TR1=0".

Then, the hydraulic pressure command value TR2 is held for a predetermined time T1S exclusively set for the subsequent speed change, as is depicted by step S402' of the flowchart of FIG. 11. The predetermined time T1S is set shorter than the predetermined time T15 set at the normal up-shift speed change for the purpose of reducing a dead time of gear operation in the intermediate gear stage.

Thereafter, steps that are the same as those applied to the toward-engagement frictional element (viz., 3-5 reverse clutch 3-5R/C) at the former speed change are carried out to finish the second speed change.

By carrying out the select-low control, the hydraulic pressure command value for the 3-5 reverse clutch 3-5R/C has such a characteristic as shown in the solid line of (d) of FIG. 12. Thus, the continuous two speed changes can be smoothly made, and thus like in case of the downshift, undesired shift shock that would occur in the up-shift speed change can be suppressed or at least minimized.

In the following, a sequential downshift from $4^{th}$ speed (first speed stage) to $1^{st}$ speed (third speed stage) will be described with reference to the flowcharts of FIGS. 13 and 14.

Figure 13:
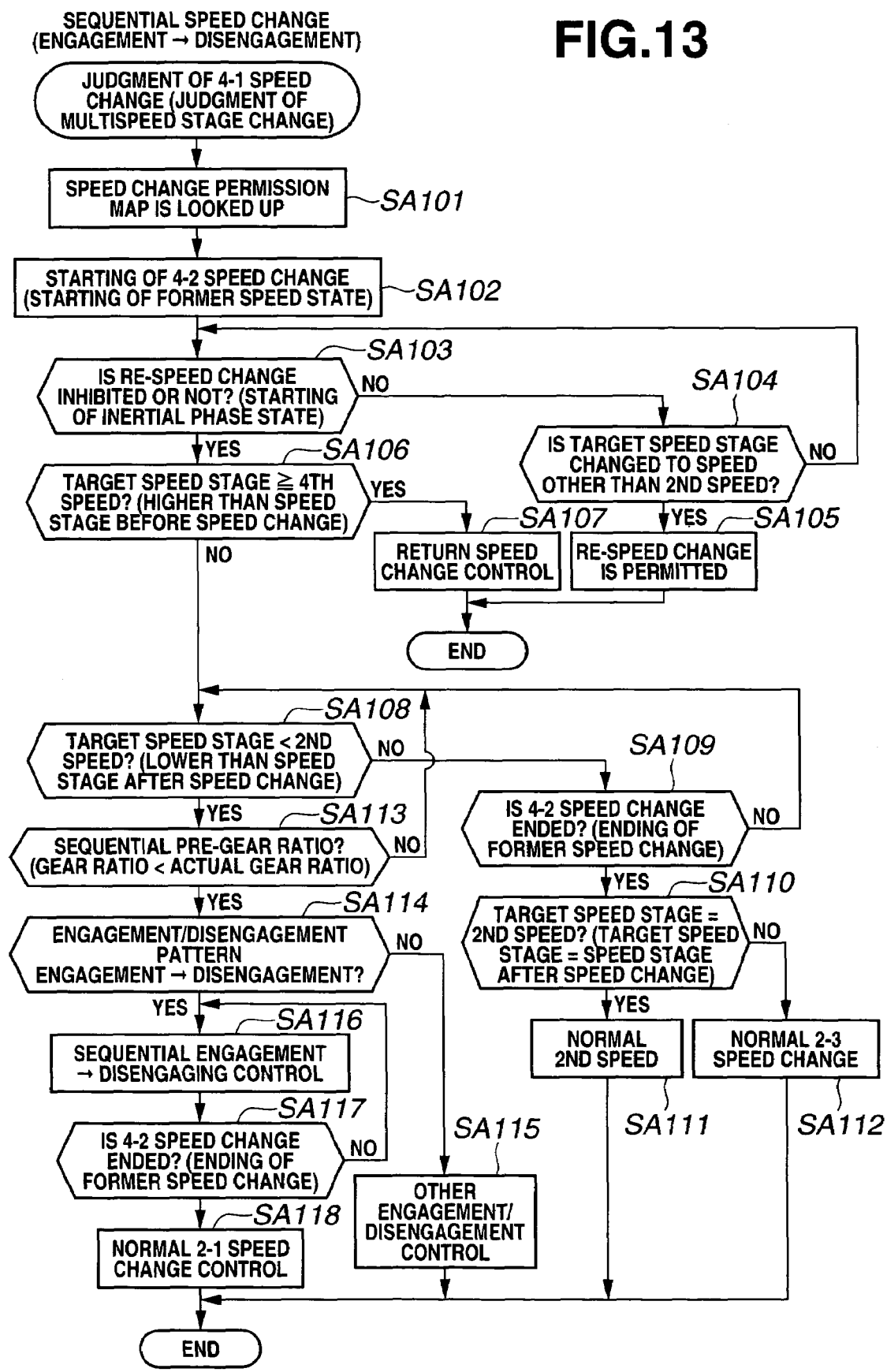
FIG. 13 is a flowchart showing programmed operation steps executed by the control unit when the transmission of the invention is subjected to a downshift that includes a shift from $4^{th}$ speed to $2^{nd}$ speed and a subsequent shift from $2^{nd}$ speed to $1^{st}$ speed.
Figure 14:
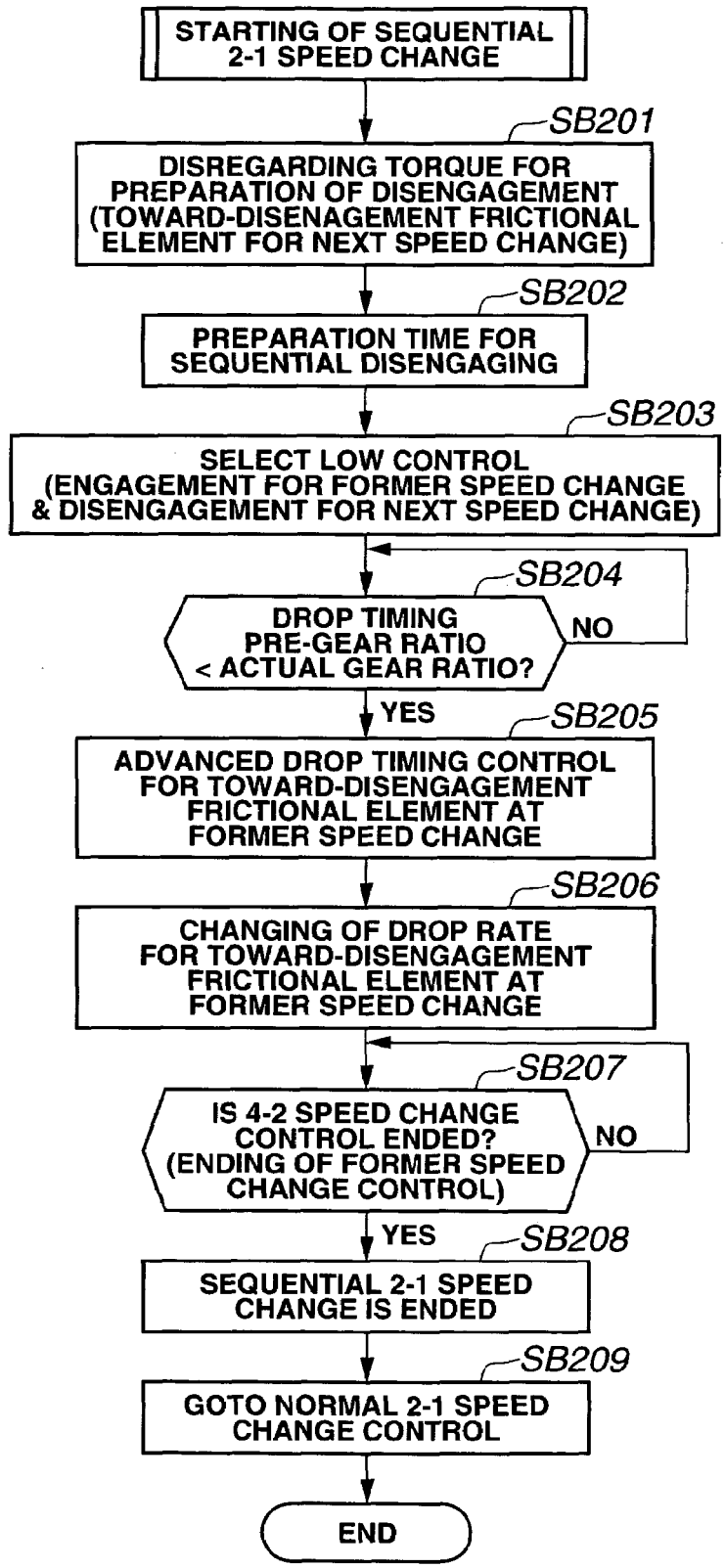
FIG. 14 is a flowchart showing programmed operation steps that constitute a sub-routine of the flowchart of FIG. 13.
Figure 15:
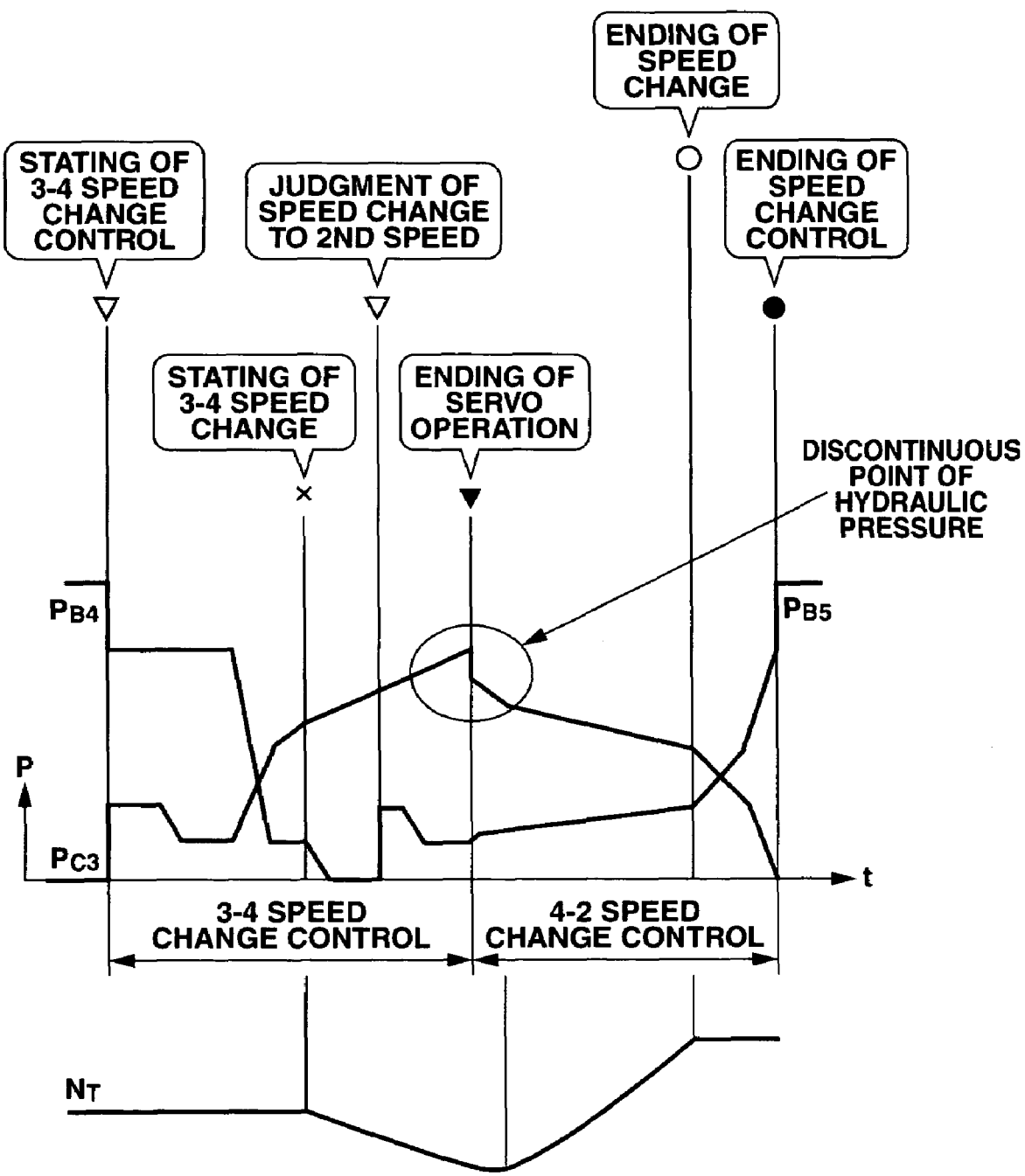
FIG. 15 is a time chart provided for explaining a conventional technique.

Upon judgment of a sequential downshift from $4^{th}$ speed to $1^{st}$ speed, a speed change permission map (not shown) is looked up, as is depicted by step SA101 in FIG. 13. This map shows speed stages that can be achieved from the current speed stage by taking only one speed change control. In the illustrated embodiment, only a change from the current speed stage to ±1 stage and a one skip downshift from the current speed stage are permitted by the map.

First, one skip downshift (first speed change or former speed change) from $4^{th}$ speed (first speed stage) to $2^{nd}$ speed (second speed stage) is thus permitted at first.

Upon this permission, the first speed change from $4^{th}$ speed to $2^{nd}$ speed is started as is depicted by step SA102 of the flowchart of FIG. 13. Then, at step SA103, judgment is carried out as to whether "re-speed change" is inhibited or not. The re-speed change is a speed change that is aimed for achieving a speed other than $2^{nd}$ speed (second speed stage). The judgment is carried as follows. At the first speed change, judgment is carried out as to whether starting of the inertia phase state takes place or not, and if it is found that the starting of the inertia phase state has taken place, judgment is so made that the re-speed change is not possible. While, if it is found that the starting of the inertial phase state has not taken place yet, judgment is so made that the re-speed change is possible.

If NO, that is, if it is judged that the re-speed change is possible, judgment is carried out as to whether or not the target speed stage is set to a speed other than $2^{nd}$ speed, as is depicted by step SA104. If YES, that is, if it is judged that the target speed stage has been set to a speed other than $2^{nd}$ speed, the re-speed change is permitted as is depicted by step SA105. While, if NO, that is, if it is judged that the target speed stage has not been set to a speed other than $2^{nd}$ speed, the operation flow goes back to step SA103.

If YES at step SA103, that is, if it is judged that the re-speed change is not possible, judgment is carried out as to whether the target speed stage is aimed for a speed equal to or over $4^{th}$ speed that can be provided by the current speed stage, as is depicted by step SA106. If the target speed stage is higher than the current speed stage, a so-called "return speed change control" is carried out regarding that a change from a downshift to an up-shift has taken place, as is depicted by step SA107. The return speed change control is a known control for commencing an up-shift after canceling a downshift.

If NO at step SA106, that is, if the target speed is not equal to nor higher than 4th speed, judgment is carried out as to whether the target speed is lower than $2^{nd}$ speed or not, as is depicted by step SA108. If NO at this step, that is, if it is judged that the target speed is $2^{nd}$ speed or $3^{rd}$ speed, judgment is so made that the speed change to $2^{nd}$ speed is finished as is depicted by step SA109, and then at step SA110, judgment is carried out as to whether the target speed is $2^{nd}$ speed or $3^{rd}$ speed. If the target speed is judged $2^{nd}$ speed, a normal $2^{nd}$ speed is carried out as is depicted by step SA111, if the target speed is judged $3^{rd}$ speed, a normal speed change from $2^{nd}$ speed to $3^{rd}$ speed is carried out as is depicted by step SA112.

While if YES at step SA108, that is, if the target speed is judged lower than $2^{nd}$ speed, judgment is carried out as to whether the actual gear ratio is smaller than the second speed change starting gear ratio GR3A (viz., pre-gear ratio) or not regarding that the target speed is $1^{st}$ speed (third speed stage), as is depicted by step SA113. That is, at this step, judgment is carried out as to whether the actual gear ratio is a gear ratio provided before the time when the second speed change starting gear ratio GR3A is provided. If the judgment is so made that the actual gear ratio is the ratio provided before the time when the ratio GR3A is provided, the second speed change is suspended until the time when the actual gear ratio shows the ratio GR3A.

When the actual gear ration reaches the second speed change starting gear ratio GR3A, the suspension of the second speed change is canceled, and judgment is carried out as to whether or not there is any frictional element that effects a change from OFF state to ON state at the first speed change and effects a change from ON state to OFF state at the second speed change, as is depicted by step SA114. For the operation of step SA114, a suitable map is installed in the A/T control unit 40, that shows various combinations of speed change effected by "OFF state=>ON state=>OFF state" of each of the various frictional elements (see FIG. 2).

If NO at step SA114, that is, if it is judged that there is no frictional element that satisfies the above-mentioned condition, the operation flow goes to step SA115 to carry out ON or OFF operation for the other frictional elements. While if YES, that is, if it is judged that there is a frictional element that satisfies the above-mentioned condition, the operation flow goes to step SA116 to cause the third speed change control means 405 to carry out the speed change control. A sub-routine in the step SA114 will be described in detail hereinafter.

If at step SA117 completion of the speed change control (first speed change) from $4^{th}$ speed to $2^{nd}$ speed is judged, another speed change control (second speed change) from $2^{nd}$ speed to $1^{st}$ speed is carried out as is depicted by step SA118. With this, until the time when the first speed change is finished, distribution of the hydraulic pressure to the frictional elements is effectively made by the third speed change control means 405, and thus, the speed change control is assuredly carried out.

In the following, the sub-routine at the above-mentioned step SA116 will be described with reference to the flowchart of FIG. 14. That is, upon starting of the second speed change of the above-mentioned sequential shift, the programmed operation steps of the sub-routine are forced to start.

At first, a so-called "drop-preparation torque" for the toward-disengagement frictional element (viz., 2-6 brake 2-6/B in this case) is cancelled as is depicted by step SB201, and at the same time, a so-called "drop-preparation time" T1S is set as is depicted by step SB202. At this drop-preparation time T1S, the above-mentioned third hydraulic pressure command value is held.

In the following, the drop-preparation torque and the drop-preparation time will be explained. In normal speed change, it is preferable to instantly reduce the hydraulic pressure of the toward-disengagement frictional elements. However, if such rapid reduction of the hydraulic pressure is actually made, over drop tends to occur, which would bring about overshooting of the hydraulic pressure. If the speed change is carried out under such overshooting, both the toward-disengagement frictional elements and toward-engagement frictional elements tend to induce slippage thereof, which increases the possibility of a delay of the speed change.

Thus, in order to suppress production of such overshooting, the above-mentioned drop-preparation toque and drop-preparation time are set in the normal speed change. That is, when the second speed change is of a normal type, a control is carried out wherein, as is indicated by the broken line in the reference (d) of FIG. 8, at the starting of the speed change, the hydraulic pressure command value is lowered to a second hydraulic pressure command value (which corresponds to the drop-preparation torque), and thereafter, the hydraulic pressure command value is lowered at a predetermined rate to a third hydraulic pressure command value by taking a predetermined time (viz., drop-preparation time).

While, since, in the sequential shift, the toward-disengagement frictional element in case of the second speed change is the frictional element (viz., 2-6 brake 2-6/B) that is the toward-engagement friction element in case of the first speed change, there is no fear of the undershooting of the hydraulic pressure even if the hydraulic pressure command value is instantly varied to the third hydraulic command value at the time of starting the second speed change. Accordingly, as is depicted by step SB201, the hydraulic pressure command value for the 2-6 brake 2-6/B is lowered to the third hydraulic pressure command value disregarding the drop-preparation torque, and the third hydraulic pressure command value is kept for the predetermined time T1S (viz., drop-preparation time) as is depicted by step SB202.

While, once such second speed change is started, the hydraulic pressure command value for the 2-6 brake 2-6/B at the first speed change and the hydraulic pressure command value for the same brake 2-6/B at the second speed change are compared to select a smaller one that is actually fed to the 2-6 brake 2-6/B, as is depicted by step SB203. That is, the select-low control is carried out in step SB203.

Then, the current actual gear ratio and the second speed change starting gear ratio GR3A are compared as is depicted by step SB204. If it is judged that the actual gear ratio reaches the ratio GR3A, a so-caller "higher timing control" is carried out wherein a pressure releasing timing (or drop timing) for the toward-disengagement frictional element at the first speed change is made faster than normal timing, as is depicted by step SB205, and at the same time, a drop rate of the hydraulic pressure is increased, as is depicted by step SB206. It is to be noted that the operations from step SB204 to step SB206 are those exclusively carried out in downshift speed change. That is, in case of up-shift speed change, the operations from step SB203 to step 207 are carried out.

After the operation of step SB206, judgment is carried out as to whether the first speed change has finished or not, as is depicted by step SB207. If the judgment is so made that the first speed change has finished, the speed change from $2^{nd}$ speed to $1^{st}$ speed in the sequential shift is completed as is depicted by steps SB207 and step SB208. Thereafter, the operation mode is shifted to a normal mode for the speed change from $2^{nd}$ speed to $1^{st}$ speed, as is depicted by step SB209.

As is described hereinabove, in accordance with the present invention, even in a sequential shift, the speed change control is basically carried out in accordance with the control data previously stored in the first and second speed change control means 403 and 404. Thus, increase in number of the control data can be suppressed or at least minimized.

In case of change from the first speed change to the second speed change, the second speed change is started prior to the ending of the first speed change. Accordingly, the time needed for establishing a target speed stage can be shortened without increasing the hydraulic pressure of the first frictional elements. That is, even after the overlap period of the previous and next speed changes, the hydraulic pressure for the first frictional element is continuously used because of the work of the select-low control, and thus, the two different types of speed changes can be smoothly connected, which suppresses or at least minimizes a shift shock.

Because the second speed change is started before the end of the first speed change, the time needed for establishing the second speed change can be shortened, and thus, the time needed for establishing the third speed change (viz., change for establishing the target speed) can be shortened.

In downshift speed change, the timing (viz., pressure drop timing) at which the hydraulic pressure for the second frictional element at the first speed change is lowered toward zero is set at a relatively low level so as to smooth a toque fluctuation that is inevitably produced at an end period of the speed change, and the hydraulic pressure for the second frictional element is controlled to be gradually lowered. Usually, when, in such control, an instruction is issued for starting the second speed change during the first speed change, the hydraulic pressure for the second frictional element becomes excessive inducing delayed start of the second speed change. However, in the present invention, the drop timing of the hydraulic pressure is advanced and at the same time the hydraulic pressure is sharply lowered as compared with independent first speed change. Thus, delayed establishment of a target gear ratio can be suppressed.

In case wherein a target speed stage is changed from the second speed stage to the third speed stage after detecting the starting of the inertia phase state, the hydraulic pressure for the first frictional element is instantly changed to the third hydraulic pressure value as soon as the speed change starts. Accordingly, the hydraulic pressure command value for the first frictional element at the time of starting the second speed change, which is relatively high, can be instantly lowered.

The third hydraulic pressure command value is set to an upper limit of the hydraulic pressure value with which the first frictional element fails to make a torque transmission independently. Accordingly, even when a higher hydraulic pressure command value that is capable of permitting the first frictional element to transmit the torque at the first speed change is outputted, engagement of the first frictional element can be avoided by the work of the select-low control.

Since the hydraulic pressure for the second frictional element is increased as the input torque to the transmission increases, the time needed for releasing the second frictional element increases, which tends to induce a dead time of operation of an intermediate speed stage. However, by correcting the rate for lowering the hydraulic pressure for the second frictional element, such dead time can be removed or at least minimized.

In case wherein the data installed in the second speed change control means 404 are effectively used, the timing for starting the second speed change during the first speed change should be advanced by a degree that corresponds to a response lag inevitably produced between a time when instruction for controlling the hydraulic pressure is issued and a time when the hydraulic pressure actually shows the controlled value. Usually, the response lag is constant so long as the viscosity of the hydraulic pressure is unchanged. In view of this, a gear ratio provided before a time when the gear ratio GR3 provided at the end of the inertial phase state appears may be used as a reference ratio. That is, when the gear ratio reaches the reference ratio, the second speed change should be started. With this measure, the response lag of the hydraulic pressure can be canceled. However, since the rate of change of the gear ratio is affected by the input torque and the vehicle speed, the time when the gear ratio reaches the reference ratio is varied in accordance with the input torque and the vehicle speed. Accordingly, usually, when the second speed change control is started at a timing when the gear ratio reaches the reference ratio, there is such a possibility that a dead time of operation is produced in the intermediate speed stage. However, in the present invention, a correction is carried out wherein as the vehicle speed decreases, the difference between the second speed change gear ratio GR3A provided when the second speed change is started and the gear ratio GR3 provided when the inertia phase state is ended increases, and as the input torque to the transmission 1 increases, the above-mentioned difference increases. With this correction, the second speed change is suitably made at a suitable timing, which minimizes the dead time of operation in the intermediate speed stage.

The entire contents of Japanese Patent Application 2005-290078 filed Oct. 3, 2005 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An automatic transmission of a motor vehicle having first, second and third speed stages, the transmission comprising:
   a first frictional element that is disengaged in the first speed stage, engaged in the second speed stage established by a first speed change and disengaged in the third speed stage established by a second speed change;
   a second frictional element that is engaged in the first speed stage, disengaged in the second speed stage and disengaged in the third speed stage;
   a third frictional element that is disengaged in the first speed stage, disengaged in the second speed stage and engaged in the third speed stage; and
   a control means that, upon judgment of need of a speed change from the first speed stage to the third speed stage, starts the second speed change while carrying out the first speed change, carries out comparison between a hydraulic pressure command value for the first frictional element at the first speed change and another hydraulic pressure command value for the first frictional element at the second speed change to select a smaller one, and practically applies the smaller value to the first frictional element.

2. An automatic transmission of a motor vehicle having first, second and third speed stages, the transmission comprising:
   a first frictional element that is disengaged in the first speed stage, engaged in the second speed stage established by a first speed change, and disengaged in the third speed stage established by a second speed change;
   a second frictional element that is engaged in the first speed stage, disengaged in the second speed stage and disengaged in the third speed stage;
   a third frictional element that is disengaged in the first speed stage, disengaged in the second speed stage and engaged in the third speed stage;
   a first speed change control means that, upon establishment of the first speed stage, outputs a hydraulic pressure command to cause the first frictional element to be engaged and the second frictional element to be disengaged;
   a second speed change control means that, upon establishment of the second speed stage, outputs a hydraulic pressure command to cause the first frictional element to be disengaged and the third frictional element to be engaged;
   judging means that judges a necessity of shift from the first speed stage to the third speed stage based on an operation condition of the vehicle; and
   a third speed change control means that induces starting of operation of the first speed change control means when the judging means judges the necessity of the shift and induces starting of the second speed change while carrying out the first speed change when a current gear ratio reaches a first predetermined gear ratio that is established prior to a time when an inertial phase state of the first speed change is ended or when a value of a parameter corresponding to the current gear ration reaches a value corresponding to the first predetermined gear ratio, wherein upon starting of the second speed change, the third speed change control means compares a hydraulic pressure command value for the first frictional element outputted from the first speed change control means and a hydraulic pressure command value for the first frictional element outputted from the second speed change control means to select a smaller one and practically applies the smaller one to the first frictional element.

3. An automatic transmission as claimed in claim 2, in which the first speed change control means and the second speed change control means are of a type that controls a speed change in a downshift direction, in which the first speed change control means keeps the hydraulic pressure command value for the second frictional element at a first hydraulic pressure value once the first speed change starts and issues a hydraulic pressure command to gradually reduce the hydraulic pressure for the second frictional element to zero at a first predetermined rate once the current gear ratio reaches the gear ratio that is provided when the inertia phase state of the first speed change is ended, and in which the third speed change control means is provided with a timing correction means that advances the timing when the second frictional element is disengaged for reducing the hydraulic pressure to zero in case where, after detection of starting of the inertia phase state, a target speed stage is changed from the second speed stage to the third speed stage.

4. An automatic transmission as claimed in claim 3, in which the second speed change control means is configured to carry out, upon single speed change from the second speed stage to the third speed stage, lowering the hydraulic pressure for the first frictional element to a second predetermined pressure value upon starting of the speed change, and thereafter lowering the hydraulic pressure for the frictional element from the second predetermined pressure to a third predetermined pressure at a second predetermined rate, and in which the third speed change control means is configured to carry out, upon detecting the starting of the inertia phase state, varying the hydraulic pressure for the first frictional element to the third predetermined pressure upon starting of the speed change when the target speed change state is changed from the second speed stage to the third speed stage.

5. An automatic transmission as claimed in claim 4, in which the third predetermined pressure is an upper limit of the hydraulic pressure with which the first frictional element fails to make a torque transmission.

6. An automatic transmission as claimed in claim 3, in which the timing correction means of the third speed change control means increases the first predetermined rate as an input torque to the first frictional element increases.

7. An automatic transmission as claimed in claim 2, in which the third speed change control means is provided with a start timing correction means that corrects the first predetermined gear ratio or the value of the predetermined parameter in accordance with a vehicle speed and/or a torque applied to the transmission.

8. An automatic transmission as claimed in claim 7, in which as the vehicle speed lowers, the start timing correction means increases a difference between the first predetermined gear ratio and the gear ratio established when the inertia phase state is ended or a difference between a value of a parameter corresponding to the first predetermined gear ratio and a value of the parameter corresponding to the gear ratio established when the inertial phase state is ended, and in which the start timing correction means increases the difference as an input torque to the transmission increases.

9. An automatic transmission of a motor vehicle having first, second and third speed stages, the transmission comprising:
　　a first frictional element that is disengaged in the first speed stage, engaged in the second speed stage established by a first speed change and disengaged in the third speed stage established by a second speed change;
　　a second frictional element that is engaged in the first speed stage, disengaged in the second speed stage and disengaged in the third speed stage;
　　a third frictional element that is disengaged in the first speed stage, disengaged in the second speed stage and engaged in the third speed stage; and
　　a speed change control means that, upon judgment of need of a speed change from the first speed stage to the third speed stage based on an operation condition of the vehicle, starts the second speed change prior to ending of the first speed change,
　　wherein each of the first, second and third frictional elements is engaged when a hydraulic pressure command value issued from the speed change control means increases and disengaged when the hydraulic pressure command value decreases, and
　　wherein upon starting of the second speed change prior to an ending of the first speed change, the speed change control means compares a hydraulic pressure command value for the first frictional element at the first speed change and a hydraulic pressure command value for the first frictional element at the second speed change to select a smaller one and practically applies the smaller one to the first frictional element.

* * * * *